United States Patent
Urabe et al.

(10) Patent No.: US 12,490,216 B2
(45) Date of Patent: Dec. 2, 2025

(54) INFORMATION PROVIDING APPARATUS, METHOD FOR PROVIDING INFORMATION, COMPUTER-READABLE RECORDING MEDIUM, AND DEVICE MANAGEMENT SYSTEM

(71) Applicant: Yokogawa Electric Corporation, Tokyo (JP)

(72) Inventors: Hiroo Urabe, Tokyo (JP); Yusaku Yoshida, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 315 days.

(21) Appl. No.: 18/231,350

(22) Filed: Aug. 8, 2023

(65) Prior Publication Data

US 2024/0064681 A1 Feb. 22, 2024

(30) Foreign Application Priority Data

Aug. 17, 2022 (JP) .................................. 2022-130114

(51) Int. Cl.
H04W 60/00 (2009.01)
H04W 8/18 (2009.01)

(52) U.S. Cl.
CPC ........... *H04W 60/00* (2013.01); *H04W 8/183* (2013.01)

(58) Field of Classification Search
CPC .............................. H04W 60/00; H04W 8/183
USPC ........................................................ 455/35.1
See application file for complete search history.

(56) References Cited

U.S. PATENT DOCUMENTS

| | | | | |
|---|---|---|---|---|
| 2004/0235455 | A1* | 11/2004 | Jiang | G01R 33/093 455/411 |
| 2006/0229054 | A1* | 10/2006 | Erola | H04M 1/24 455/445 |
| 2014/0258434 | A1* | 9/2014 | Hong | H04W 4/14 709/206 |
| 2018/0247296 | A1* | 8/2018 | Win | G06Q 30/0207 |
| 2022/0210722 | A1 | 6/2022 | Saini et al. | |

FOREIGN PATENT DOCUMENTS

| | | |
|---|---|---|
| JP | 2016154321 A | 8/2016 |
| JP | 6436489 B2 | 12/2018 |

OTHER PUBLICATIONS

Extended European Search Report (EESR) dated Jan. 23, 2024 for European Patent Application No. 23190776.7.

* cited by examiner

*Primary Examiner* — Mark G. Pannell
(74) *Attorney, Agent, or Firm* — RANKIN, HILL & CLARK LLP

(57) ABSTRACT

An overall management server acquires device registration information in which device setting information including device identification information of a device and communication identification information set for causing the device to perform communication and application information on an application collecting information transmitted from the device are associated with each other and generates communication registration information associating communication contract information indicating a contract state of the communication with the device registration information.

10 Claims, 15 Drawing Sheets

FIG.3

| CONTRACTOR INFORMATION | COMMUNI-CATION IDEN-TIFICATION INFORMATION | COMMUNICATION-SPECIFIC INFORMATION | DEVICE IDENTIFICATION INFORMATION | APPLICATION IDENTIFICATION INFORMATION | APPLICATION HIERARCHY INFORMATION |
|---|---|---|---|---|---|
| CONTRACTOR U1 | SIM-A | 111-1111-1111 | PLANT DEVICE A | APPLICATION A | HIERARCHICAL STRUCTURE 001 |
| | SIM-B | 222-2222-2222 | PLANT DEVICE B | APPLICATION B | HIERARCHICAL STRUCTURE 002 |
| | SIM-C | 333-3333-3333 | PLANT DEVICE C | APPLICATION C | HIERARCHICAL STRUCTURE 003 |
| | ... | ... | ... | ... | ... |

| DEVICE IDENTIFICATION INFORMATION | COMMUNICATION IDENTIFICATION INFORMATION | APPLICATION IDENTIFICATION INFORMATION | APPLICATION HIERARCHY INFORMATION | ... |
|---|---|---|---|---|
| PLANT DEVICE A | SIM-A | APPLICATION A | HIERARCHICAL STRUCTURE 001 | ... |
| PLANT DEVICE B | SIM-B | APPLICATION B | HIERARCHICAL STRUCTURE 002 | ... |
| PLANT DEVICE C | SIM-C | APPLICATION C | HIERARCHICAL STRUCTURE 003 | ... |
| ... | ... | ... | ... | ... |

DEVICE MANAGEMENT SYSTEM MANAGEMENT SCREEN

DISPLAY CONDITION

SELECT DISPLAY CONDITION (●) ORDER OF DEVICE ID    ( ) ORDER OF INSTALLATION DATE AND TIME    ( ) ORDER OF REGISTRATION DATE AND TIME

LIST OF REGISTERED DEVICES

LIST OF REGISTERED DEVICES IS DISPLAYED IN ORDER OF DEVICE ID

| DEVICE ID | SIM ID | APPLICATION ID | ... |
|---|---|---|---|
| PLANT DEVICE A | SIM-A | APPLICATION A | ... |
| PLANT DEVICE B | SIM-B | APPLICATION B | ... |
| PLANT DEVICE C | SIM-C | APPLICATION C | ... |
| ... | ... | ... | ... |

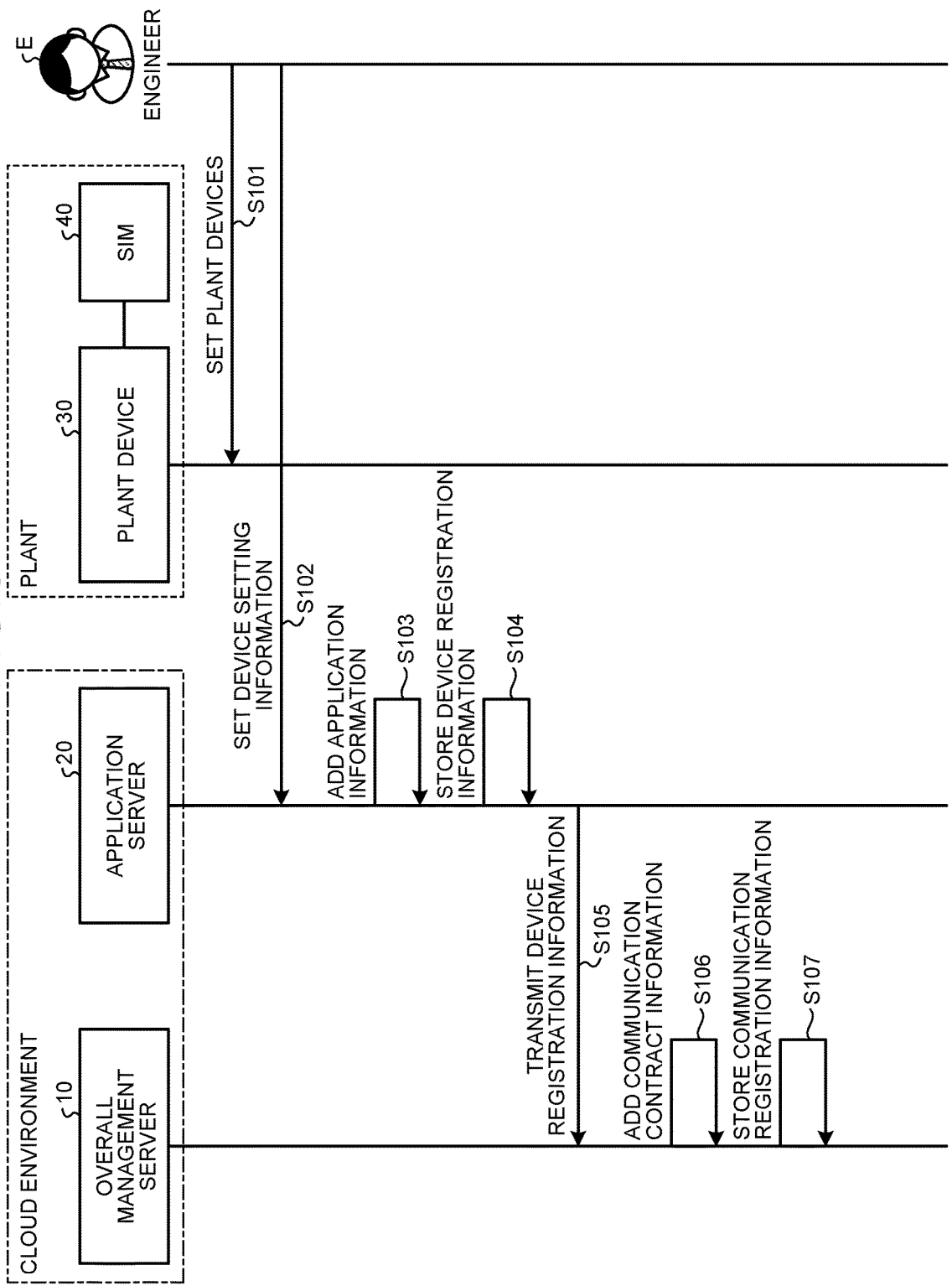

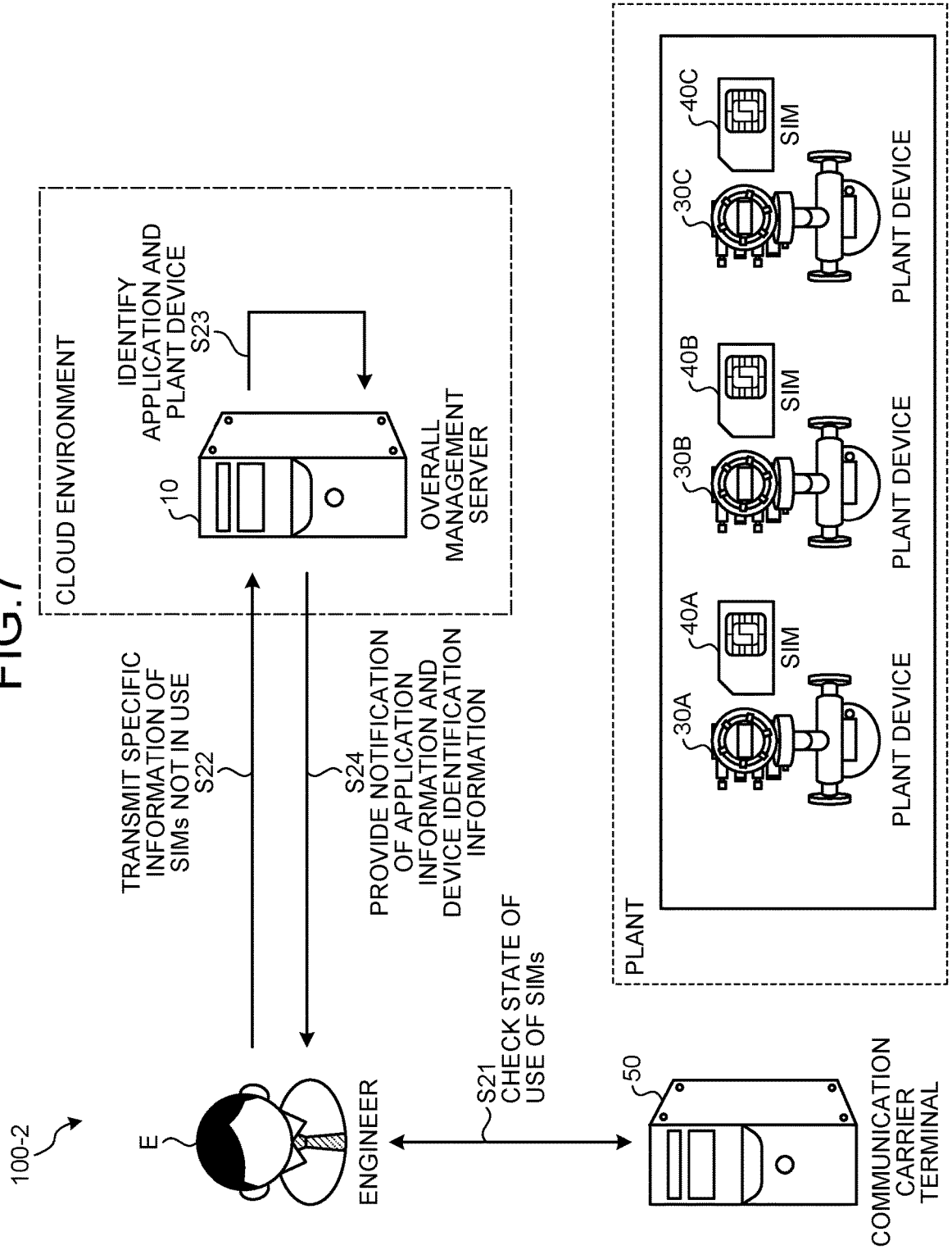

INFORMATION PROVIDING APPARATUS, METHOD FOR PROVIDING INFORMATION, COMPUTER-READABLE RECORDING MEDIUM, AND DEVICE MANAGEMENT SYSTEM

CROSS-REFERENCE TO RELATED APPLICATION

The present application claims priority to and incorporates by reference the entire contents of Japanese Patent Application No. 2022-130114 filed in Japan on Aug. 17, 2022.

FIELD

The present invention relates to an information providing apparatus, a method for providing information, a computer-readable recording medium, and a device management system.

BACKGROUND

Conventionally, in measurement systems for plants using a cloud environment, in places in which there are no wired communication facilities, wireless communication using a cellular phone network is sometimes used to perform communication with devices. In the above devices, the devices and subscriber identity modules (SIMs) are managed associated with each other. The related technologies are described, for example, in: Japanese Patent No. 6436489.

However, in the conventional technologies, it is difficult to efficiently manage and grasp the state of use of SIMs, and there is room for improvement.

The present invention has been made in view of the above, and an object thereof is to efficiently manage and grasp the state of use of SIMs.

SUMMARY

According to an aspect of the embodiments, an information providing apparatus includes, an acquisition unit acquiring device registration information in which device setting information including device identification information of a device and communication identification information set for causing the device to perform communication and application information on an application collecting information transmitted from the device are associated with each other, and a generation unit generating communication registration information associating communication contract information indicating a contract state of the communication with the device registration information.

According to an aspect of the embodiments, a method for providing information, the method includes, acquiring device registration information in which device setting information including device identification information of a device and communication identification information set for causing the device to perform communication and application information on an application collecting information transmitted from the device are associated with each other, and generating communication registration information associating communication contract information indicating a contract state of the communication with the device registration information.

According to an aspect of the embodiments, a computer-readable recording medium having stored therein a computer program for providing information that causes a computer to execute a process, the process includes, acquiring device registration information in which device setting information including device identification information of a device and communication identification information set for causing the device to perform communication and application information on an application collecting information transmitted from the device are associated with each other, and generating communication registration information associating communication contract information indicating a contract state of the communication with the device registration information.

According to an aspect of the embodiments, a device management system includes, an information management apparatus executing an application collecting information transmitted from a device, and an information providing apparatus, the information management apparatus including a receiver receiving device setting information including device identification information of the device and communication identification information set for causing the device to perform communication from the device, and a transmitter transmitting device registration information associating application information on the application with the device setting information, and the information providing apparatus including an acquisition unit acquiring the device registration information from the information management apparatus, and a generation unit generating communication registration information associating communication contract information indicating a contract state of the communication with the device registration information.

BRIEF DESCRIPTION OF THE DRAWINGS

FIG. 3 is a diagram of an example of a communication registration information storage unit of an overall management server according to the first embodiment;

FIG. 4 is a diagram of an example of a device registration information storage unit of an application server according to the first embodiment;

FIG. 5 is a diagram of a specific example of a display screen of a device registration list according to the first embodiment;

FIG. 6 is a sequence diagram of an example of a procedure of device management processing according to the first embodiment;

FIG. 7 is a diagram of a configuration example of a device management system according to a second embodiment;

DESCRIPTION OF EMBODIMENTS

The following describes an information providing apparatus, a method for providing information, a computer program for providing information, and a device management system according to an embodiment of the present invention in detail with reference to the accompanying drawings. The present invention is not limited by the embodiments described below.

First Embodiment

The following in a first embodiment describes registration processing for communication registration information associating information on devices, subscriber identity modules (SIMs), and web applications with each other. The following describes a configuration, a configuration of each apparatus, and a processing procedure of a device management system 100-1 according to the first embodiment in order and finally describes the effects of the first embodiment.

1. Configuration of Device Management System 100-1

Figure 1:
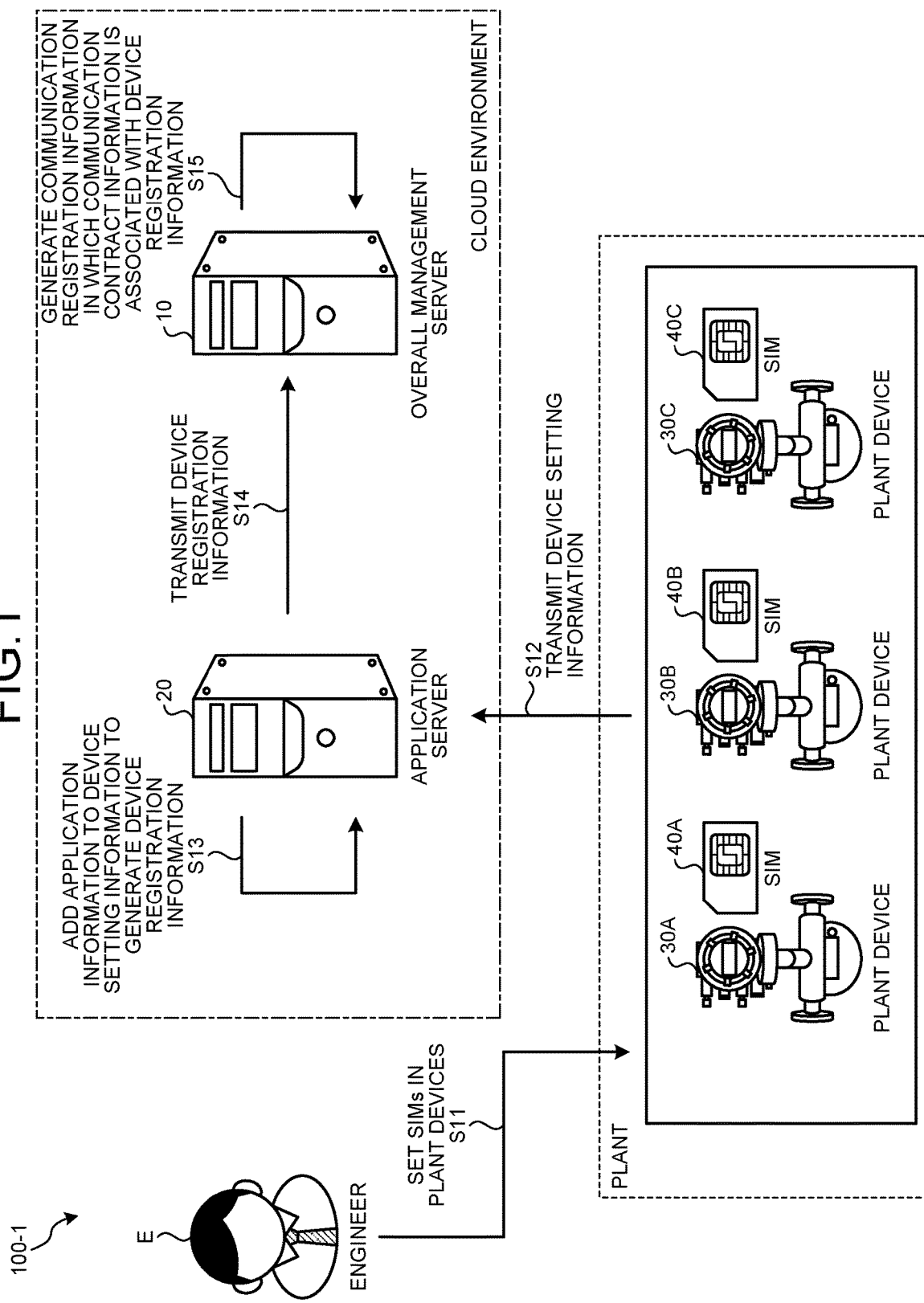
FIG. 1 is a diagram of a configuration example of a device management system according to a first embodiment.

The following describes the configuration of the device management system 100-1 according to the first embodiment in detail using FIG. 1. FIG. 1 is a diagram of a configuration example of the device management system 100-1 according to the embodiment. The following describes a configuration example of the entire device management system 100-1, processing by the device management system 100-1, and problems with a device management system of a reference technology in order and finally describes the effects of the device management system 100-1. The first embodiment describes factory production remote monitoring using plant devices, which are devices installed in a plant, as an example, but there are no limitations on devices and the field of use, and the embodiment can also be applied to environmental measurement remote monitoring such as power monitoring, wind power generation, water supply and sewage monitoring, and river monitoring.

1-1. Configuration Example of Entire Device Management System 100-1

The device management system 100-1 has an overall management server 10, which is an information providing apparatus, an application server 20, which is an information management apparatus, plant devices 30 (30A, 30B, 30C), and SIMs 40 (40A, 40B, 40C). The overall management server 10 and the application server 20 are built in a cloud environment. The plant devices 30 (30A, 30B, 30C) are installed in a plant and set the respective SIMs 40 (40A, 40B, 40C).

The device management system 100-1 illustrated in FIG. 1 may include a plurality of the overall management servers 10 or a plurality of the application servers 20. The overall management server 10 may be integrated with the application server 20.

1-2. Processing by Entire Device Management System 100-1: Device Registration Processing The following describes registration processing for the communication registration information in the device management system 100-1 as described above. Steps S11 to S15 below can be executed in a different order. Some processing at Steps S11 to S15 below may be omitted.

1-2-1. Plant Device Setting Processing

An engineer E, who is a plant manager, sets the SIMs 40 in the plant devices 30 (Step S11). For example, the engineer E sets the SIMs 40 by inserting the card-shaped SIMs 40 (40A, 40B, 40C) into card slots of the respective plant devices 30 (30A, 30B, 30C), which are sensor devices. In addition to including a sensor inside, the sensor device may be a sensor device connected to an external sensor.

1-2-2. Device Setting Information Transmission Processing

The plant devices 30 or the engineer E transmits device setting information, which is a combination of identification information of the plant devices 30 and identification information of the set SIMs 40, to the application server 20 (Step S12). For example, the plant devices 30 transmit a combination of an identification number of hardware and an identification number of a SIM card as the device setting information to the application server 20 via a cellular phone network line.

1-2-3. Application Information Addition Processing

The application server 20 adds application information to the device setting information to generate device registration information (Step S13). For example, the application server 20 generates the device registration information by adding the application information such as identification information of a web application collecting plant information received by the plant devices 30 and hierarchical information indicating a hierarchical structure of the web application to the device setting information.

1-2-4. Device Registration Information Transmission Processing

The application server 20 transmits the device registration information to the overall management server 10 (Step S14).

1-2-5. Communication Registration Information Generation Processing

The overall management server 10 associates communication contract information of the SIMs 40 with the device registration information to generate the communication registration information (Step S15). For example, the overall management server 10 generates the communication registration information by adding the communication contract information such as contractor names and contract phone numbers of the SIMs 40 to the device registration information.

1-3. Device Management Processing of Reference Technology

The following describes an outline of device management processing as a reference technology and further describes problems with the reference technology.

1-3-1. Outline of Device Management Processing of Reference Technology

The device management processing of the reference technology performs management as follows. For example, in the management of plant devices and SIMs, a combination of hardware is fixed by a phone number of a SIM, and the hardware is identified by the phone number of the SIM. Meanwhile, the plant devices and the SIMs are often arranged as separate components and used in discretionary combinations, and thus a combination of the hardware and the SIMs may be managed by a separately managed list. In general, information on the above combination is managed within individual web applications. In the use of the SIMs, association with the contract information of the SIMs is also necessary, and this information is often managed by associating it with an order form or the like.

1-3-2. Problems with Device Management Processing of Reference Technology

With the device management processing of the reference technology, it is difficult to efficiently manage and grasp the state of use of the SIMs. For example, a provider of a service including the SIMs (a communication carrier) can monitor, from the phone numbers of the SIMs, their state of operation and identify the SIMs not in use, but it is difficult to identify which SIM is being used on which web application.

That is, a communication service including the SIMs is defined on each web application, and thus the SIMs can only be managed on a per web application basis. In such a case, the communication carrier must log in to the web application to investigate which SIM is being used by which web application, making it difficult to identify the relation between the SIMs and the web applications.

1-4. Effects of Device Management System 100-1

The following describes an outline of the device management system 100-1 according to the first embodiment and further describes the effects of the device management system 100-1.

1-4-1. Outline of Device Management System 100-1

First, the engineer E, who is the plant manager, sets the SIMs 40 in the plant devices 30. Second, the plant devices 30 transmit the device setting information, which is a combination of device identification information of the plant devices 30 and communication identification information of the set SIMs 40, to the application server 20. Third, the application server 20 adds the application information to the device setting information to generate the device registration information. Fourth, the application server 20 transmits the device registration information to the overall management server 10. Fifth, the overall management server 10 associates the communication contract information of the SIMs 40 with the device registration information to generate the communication registration information.

1-4-2. Effects of Device Management System 100-1

By integrating and linking the management of the plant devices 30 and the SIMs 40 on individual web applications and the communication contract information of the SIMs 40 of the communication carrier providing the service including the SIM 40, the relation among the plant devices 30, the SIMs 40, and the communication contract information can be centrally managed. Thus, the communication carrier can easily identify the relation between the SIMs and the web applications. The engineer E, who is the plant manager, can easily identify the plant devices 30 from the phone numbers of the SIMs 40 not in use in the plant, judging from communication records. The engineer E can easily identify the phone numbers of the SIMs 40 from the device identification information of the plant devices 30. As described above, the device management system 100-1 can efficiently grasp the state of use of the SIMs 40.

2. Configuration of Each Apparatus of Device Management System 100-1

Figure 2:
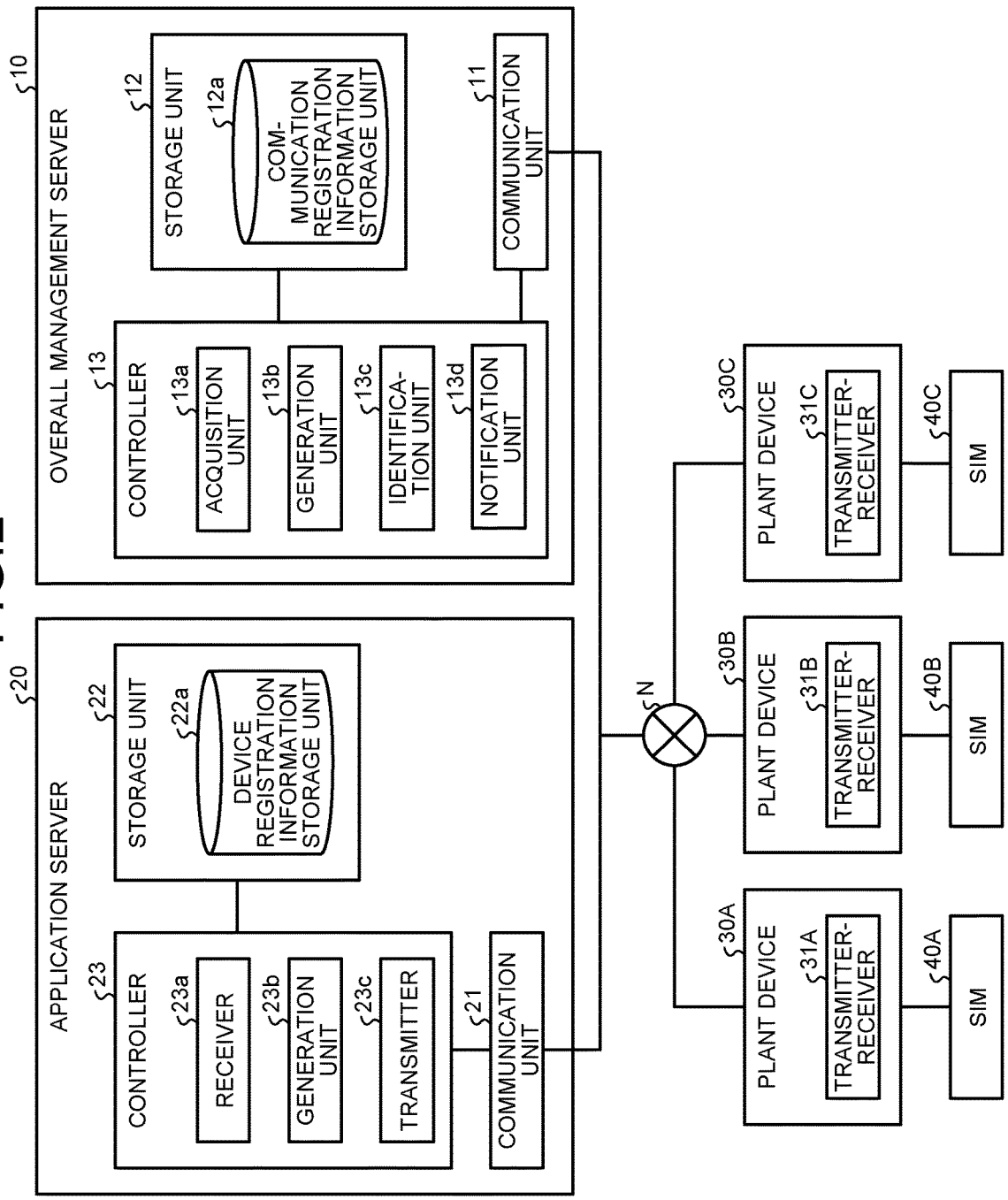
FIG. 2 is a block diagram of a configuration example of each apparatus according to the first embodiment.

The following describes a functional configuration of each apparatus of the device management system 100-1 illustrated in FIG. 1 using FIG. 2. FIG. 2 is a block diagram of a configuration example of each apparatus according to the first embodiment. The following describes a configuration example of the entire device management system 100-1 according to the first embodiment and further specifically describes configuration examples of the overall management server 10, the application server 20, the plant devices 30, and the SIMs 40 according to the first embodiment.

2-1. Configuration Example of Entire Device Management System 100

As illustrated in FIG. 2, the device management system 100-1 has the overall management server 10, the application server 20, the plant devices 30 (30A, 30B, 30C), and the SIMs 40 (40A, 40B, 40C). The overall management server 10 and the application server 20 are communicably connected to each other with a certain communication network in the cloud environment. The plant devices 30 are communicably connected to each other with a communication network N such as a cellular phone network.

The overall management server 10 and the application server 20 are not limited to server apparatuses built in the cloud environment but may be physical servers, virtual machines, containers, or the like.

2-2. Configuration Example of Overall Management Server 10

The following first describes a configuration example of the overall management server 10, which is an information providing apparatus, using FIG. 2. The overall management server 10 has a communication unit 11, a storage unit 12, and a controller 13. The overall management server 10 may have an input unit (for example, a keyboard, a mouse, or the like) receiving various types of operations from a manager of the device management system 100-1 and a display unit (for example, a liquid crystal display or the like) for displaying various types of information.

2-2-1. Communication Unit 11

The communication unit 11 is responsible for data communication with other apparatuses. For example, the communication unit 11 performs data communication with each communication apparatus via a router or the like. The communication unit 11 can also perform data communication with an operator's terminal not illustrated.

2-2-2. Storage Unit 12

The storage unit 12 stores therein various types of information referred to when the controller 13 operates and various types of information acquired when the controller 13 operates. The storage unit 12 has a communication registration information storage unit 12a. The storage unit 12 can be implemented by, for example, a semiconductor memory element such as a random access memory (RAM) or a flash memory, a storage device such as a hard disk or an optical disk, or the like. In the example in FIG. 2, the storage unit 12 is installed inside the overall management server 10, but it may be installed outside the overall management server 10, or a plurality of storage units may be installed.

2-2-2-1. Communication Registration Information Storage Unit 12a

The communication registration information storage unit 12a stores therein the communication registration information generated by a generation unit 13b of the controller 13 described below. The following describes an example of information that the communication registration information storage unit 12a stores therein using FIG. 3. FIG. 3 is a diagram of an example of the communication registration information storage unit 12a of the overall management server 10 according to the first embodiment. In the example in FIG. 3, the communication registration information storage unit 12a has items such as "contractor information," "communication identification information," "communication-specific information," "device identification information," "application identification information," and "application hierarchy information."

The "contractor information" indicates information on a contractor of communication services and is, for example, a contract number, a name, an address, a contact address, or the like of the contractor. The "communication identification information" indicates identification information for identifying a component that enables the communication services and is, for example, a card identification number of the SIMs 40. The "communication-specific information" indicates information for use in each communication service and is, for example, a phone number given to the SIMs 40. The "device identification information" indicates identification information for identifying the device and is, for example, a hardware identification number of the plant devices 30. The "application identification information" indicates identification information for identifying the application and is, for example, an identification number of the application server 20 or an identification number of an application use area. The "application hierarchy information" indicates location information for identifying an area in which the application is installed and is, for example, location information for identifying a hierarchical structure of a management area managed by a communication service provider, an application area managed by a communication service operator, and the like.

That is, FIG. 3 illustrates an example in which, for the SIMs 40 contracted by the contractor information "Contractor U1," the communication-specific information of the SIM 40A identified by the communication identification information "SIM-A" is "111-1111-1111," the device identification information thereof is "Plant Device A," the application identification information thereof is "Application A," and the application hierarchy information thereof is "Hierarchical Structure 001," the communication-specific information of the SIM 40B identified by the communication identification information "SIM-B" is "222-2222-2222," the device identification information thereof is "Plant Device B," the application identification information thereof is "Application B," and the application hierarchy information thereof is "Hierarchical Structure 002," and the communication-specific information of the SIM 40C identified by the communication identification information "SIM-C" is "333-3333-3333," the device identification information thereof is "Plant Device C," the application identification information thereof is "Application C," and the application hierarchy information thereof is "Hierarchical Structure 003."

2-2-3. Controller 13

The controller 13 is responsible for the control of the entire overall management server 10. The controller 13 has an acquisition unit 13a, the generation unit 13b, an identification unit 13c, and a notification unit 13d. The controller 13 can be implemented by, for example, an electronic circuit such as a central processing unit (CPU) or a micro processing unit (MPU) or an integrated circuit such as an application specific integrated circuit (ASIC) or a field programmable gate array (FPGA).

2-2-3-1. Acquisition Unit 13a

The acquisition unit 13a acquires the device registration information in which the device setting information including the device identification information of a device and the communication identification information set for causing the device to perform communication and the application information on an application collecting information transmitted from the device are associated with each other. The device is, for example, the plant device 30 including at least either a communication device or a sensor device installed in a plant, acquiring plant information (for example, sensor values) from the plant, and transmitting the plant information to a designated destination. The communication identification information included in the device setting information is identification information of a SIM card inserted into the device for causing the device to transmit information to the application. The application information is information including the application identification information, which is the identification information of the application, and the application hierarchy information, which is the location information of the application. For example, the application identification information is the identification number of the application server 20 and the identification number of the application use area. The application hierarchy information is location information for identifying the hierarchical structure of the management area managed by the communication service provider, the application area managed by the communication service operator, and the like.

To describe it using a specific example, the acquisition unit 13a acquires, as the device registration information of the plant device 30A, information in which the application information {the application identification information: Application A, the application hierarchy information: Hierarchical Structure 001} is added to the device setting information {the device identification information: Plant Device A, the communication identification information: SIM-A}.

The acquisition unit 13a also acquires the device registration information in which the application information of the application and the device setting information of the device having acquired the plant information are associated with each other from the application collecting the plant information. To describe it using a specific example, the acquiring unit 13a acquires, as the device setting information of the plant device 30A, information with the application information of Application A collecting the plant information of the plant device 30A added, acquires, as the device setting information of the plant device 30B, information with the application information of Application B collecting the plant information of the plant device 30B added, and acquires, as the device setting information of the plant device 30C, information with the application information of Application C collecting the plant information of the plant device 30C added.

2-2-3-2. Generation Unit 13b

The generation unit 13b generates the communication registration information associating the communication contract information indicating a contract state of the communication with the device registration information. The communication contract information indicates information on a contract for the communication service and is information including the contractor information, the communication identification information, and the communication-specific information. For example, the contractor information is the contract number, the name, the address, the contact address, or the like of the contractor. The communication identification information is the card identification number or the like of the SIMs 40. The communication-specific information is the phone number or the like given to the SIMs 40.

To describe it using a specific example, the generation unit 13b generates, as the communication registration information of the plant device 30A, information in which the communication contract information {the contractor information: Contractor U1, the communication identification information: SIM-A, the communication-specific information: 111-1111-1111} is added to the device registration information {the device identification information: Plant Device A, the communication identification information: SIM-A, the application identification information: Application A, the application hierarchy information: Hierarchical Structure 001}. In this process, the generation unit 13b generates the communication registration information based on, for example, {the communication identification information: SIM-A} commonly included in the device registration information and the communication contract information.

The generation unit 13b manages each of a plurality of applications and the communication registration information associated with each other. To describe it using a specific example, the generation unit 13b manages the communication registration information of Application A collecting the plant information of the plant device 30A, the communication registration information of Application B collecting the plant information of the plant device 30B, and the communication registration information of Application C collecting the plant information of the plant device 30C by storing them in the communication registration information storage unit 12a.

2-2-3-3. Identification Unit 13c

The identification unit 13c identifies information stored in the storage unit 12 in response to various types of inquiries. The details of the processing by the identification unit 13c will be described below in second to fourth embodiments.

2-2-3-4. Notification Unit 13d

The notification unit 13d provides notification of various types of information in accordance with a result identified by the identification unit 13c. For example, the notification unit 13d outputs the communication registration information that the communication registration information storage unit 12a stores therein as a display screen. The details of the processing by the notification unit 13d will be described below in the second to fourth embodiments. A specific example of the display screen output by the notification unit 13d will be described in (2-3. Specific Example of Display Screen) of the first embodiment.

2-3. Specific Example of Display Screen

The following describes the specific example of the display screen output by the notification unit 13d of the overall management server 10 using FIG. 5. FIG. 5 is a diagram of the specific example of the display screen of a device registration list according to the first embodiment. The following describes "display condition" and "list of registered devices" on a management screen of "device registration system" in this order.

2-3-1. Display Condition

As illustrated in FIG. 5, the overall management server 10 displays a display condition, which is a condition for the order of displaying the registered plant devices 30. In the example in FIG. 5, the overall management server 10 displays, as the display condition, "order of device ID" displaying them sorted in order of the device identification information of the registered plant device 30, "order of installation date and time" displaying them sorted in order of the date and time when the plant devices 30 were installed in the plant, and "order of registration date and time" displaying them sorted in order of the date and time when the communication registration information of the SIMs 40 set in the plant devices 30 were registered in a selectable manner by a radio button each. The overall management server 10 can also display the management screen for each contractor of the SIMs 40.

2-3-2. List of Registered Devices

As illustrated in FIG. 5, the overall management server 10 displays a list of registered devices, which is an outline of the communication registration information of the registered plant devices 30 in accordance with the condition selected as the display condition. In the example in FIG. 5, the overall management server 10 displays, as the list of registered devices, "device ID," which is the device identification information of the plant devices 30, "SIM ID," which is the communication identification information of the SIMs 40 set in the plant devices 30, and "application ID," which is the identification information of the web applications collecting information transmitted by the plant devices 30 in order of device ID selected by the radio button. That is, the overall management server 10 displays {device ID: Plant Device A, SIM ID: SIM-A, application ID: Application A, . . . }, {device ID: Plant Device B, SIM ID: SIM-B, application ID: Application B, . . . }, {device ID: Plant Device C, SIM ID: SIM-C, application ID: Application C, . . . }, . . . in this order.

2-3-3. Other Display

Furthermore, the overall management server 10 can display more detailed information in response to operations by a user of a terminal apparatus to which the display screen is output. For example, when "Plant Device A" is clicked on in the above list of registered devices, the overall management server 10 may display information on the device type (sensor device, gateway device, or control device) of Plant Device A and/or the plant in which it is installed. When "SIM-A" is clicked on in the above list of registered devices, the overall management server 10 may display a phone number indicating the communication-specific information of SIM-A. When "Application A" is clicked on in the above list of registered devices, the overall management server 10 may display the application hierarchy information indicating the hierarchical structure of Application A.

2-4. Configuration Example of Application Server 20

The following describes a configuration example of the application server 20, which is an information management apparatus, using FIG. 2. The application server 20 has a communication unit 21, a storage unit 22, and a controller 23. The application server 20 executes applications collecting information transmitted from devices. The application server 20 may have an input unit (for example, a keyboard, a mouse, or the like) receiving various types of operations from the manager of the device management system 100-1 and a display unit (for example, a liquid crystal display or the like) for displaying various types of information.

2-4-1. Communication Unit 21

The communication unit 21 is responsible for data communication with other apparatuses. For example, the communication unit 21 performs data communication with each communication apparatus via a router or the like. The communication unit 21 can also perform data communication with an operator's terminal not illustrated.

2-4-2. Storage Unit 22

The storage unit 22 stores therein various types of information referred to when the controller 23 operates and various types of information acquired when the controller 23 operates. The storage unit 22 has a device registration information storage unit 22a. The storage unit 22 can be implemented by, for example, a semiconductor memory element such as a RAM or a flash memory, a storage device such as a hard disk or an optical disk, or the like. In the example in FIG. 2, the storage unit 22 is installed inside the application server 20, but it may be installed outside the application server 20, or a plurality of storage units may be installed.

2-4-2-1. Device Registration Information Storage Unit 22a

The device registration information storage unit 22a stores therein the device registration information generated by a generation unit 23b of the controller 23 described below. With reference to FIG. 4, the following describes an example of the information that the device registration information storage unit 22a stores therein. FIG. 4 is a diagram of an example of the device registration information storage unit 22a of the application server 20 according to the embodiment. In the example in FIG. 4, the device registration information storage unit 22a has items such as "device identification information," "communication identification information," "application identification information," and "application hierarchy information."

The "device identification information" indicates the identification information for identifying the device and is, for example, the hardware identification number of the plant devices 30. The "communication identification information" indicates the identification information for identifying the component that enables the communication services and is, for example, the card identification number of the SIMs 40. The "application identification information" indicates the identification information for identifying the application and is, for example, the identification number of the application server 20, the identification number of the application use area, or the like. The "application hierarchy information" indicates the location information for identifying the area in which the application is installed and is, for example, the location information for identifying the hierarchical structure of the management area managed by the communication service provider, the application area managed by the communication service operator, and the like.

That is, FIG. 4 illustrates an example in which, for the plant devices 30 set by the engineer E in the plant, the communication identification information of the plant device 30A identified by the device identification information "Plant Device A" is "SIM-A," the application identification information thereof is "Application A," and the application hierarchy information thereof is "Hierarchical Structure 001," the communication identification information of the plant device 30B identified by the device identification information "Plant Device B" is "SIM-B," the application identification information thereof is "Application B," and the application hierarchy information thereof is "Hierarchical Structure 002," and the communication identification information of the plant device 30C identified by the device identification information "Plant Device C" is "SIM-C," the application identification information thereof is "Application C," and the application hierarchy information thereof is "Hierarchical Structure 003."

2-4-3. Controller 23

The controller 23 is responsible for the control of the entire application server 20. The controller 23 has a receiver 23a and a transmitter 23c. The controller 23 can be implemented by, for example, an electronic circuit such as a CPU or a MPU or an integrated circuit such as an ASIC or an FPGA.

2-4-3-1. Receiver 23a

The receiver 23a receives the device setting information including the device identification information of a device and the communication identification information for causing the device to perform communication from the device. To describe it using a specific example, the receiver 23a receives the device setting information {the device identification information: Plant Device A, the communication identification information: SIM-A} transmitted from the plant device 30A, the device setting information {the device identification information: Plant Device B, the communication identification information: SIM-B} transmitted from the plant device 30B, and the device setting information {the device identification information: Plant Device C, the communication identification information: SIM-C} transmitted from the plant device 30C.

The receiver 23a can also receive various types of inquiries from the engineer E. For example, the receiver 23a receives, as inquiries about the plant managed by the engineer E, requests of the device identification information of the plant devices 30, the communication identification information of the SIMs 40, and the identification information of the web applications.

2-4-3-2. Generation Unit 23b

The generation unit 23b generates the device registration information associating the application information on the application with the device setting information. To describe it using a specific example, the generation unit 23b generates, as the device registration information of the plant device 30A, information in which the application information {the application identification information: Application A, the application hierarchy information: Hierarchical Structure 001} is added to the device setting information {the device identification information: Plant Device A, the communication identification information: SIM-A}. The generation unit 23b stores the device registration information in the device registration information storage unit 22a.

2-4-3-3. Transmitter 23c

The transmitter 23c transmits the device registration information associating the application information on the application with the device setting information. To describe it using a specific example, the transmitter 23c transmits, as the device registration information of the plant device 30A generated by the generation unit 23b, {the device identification information: Plant Device A, the communication identification information: SIM-A, the application identification information: Application A, the application hierarchy information: Hierarchical Structure 001} to the overall management server 10.

The transmitter 23c can also transmit answers to various types of inquiries to the engineer E. For example, the transmitter 23c transmits, as answers to inquiries about the plant managed by the engineer E, the device identification information of the plant devices 30, the communication identification information of the SIMs 40, and the identification information of the web applications.

2-5. Configuration Example of Plant Devices 30

The following describes a configuration example of the plant devices 30 using FIG. 2. For example, the plant devices 30 include a sensor device, which is a measurement device, a gateway device, which is a communication device, and a control device, which is responsible for the control of the devices. The plant devices 30 (30A, 30B, 30C) have transmitter-receivers 31 (31A, 31B, 31C).

2-5-1. Transmitter-Receivers 31

The transmitter-receivers 31 transmit various types of information. For example, the transmitter-receivers 31 transmit the received plant information to the application server 20. The transmitter-receivers 31 also receive various types of information. For example, the transmitter-receivers 31 receive the plant information in the plant.

2-6. Configuration Example of SIMs 40

The following describes a configuration example of the SIMs 40 using FIG. 2. For example, the SIMs 40 (40A, 40B, 40C) are card-shaped components set by being inserted into the card slots of the respective plant devices 30 (30A, 30B, 30C). The SIMs 40 also have the card identification number, which is identification information for identifying the SIM card, and the phone number of the SIMs 40, which is information in order to use each communication service.

3. Processing Procedure of Device Management System 100-1

The following describes the processing procedure of the device management system 100-1 according to the first embodiment using FIG. 6. FIG. 6 is a sequence diagram of an example of the procedure of device management processing according to the first embodiment. The processing at Steps S101 to S107 below can be executed in a different order. Some processing at Steps S101 to S107 below may be omitted.

3-1. Plant Device Setting Processing

The engineer E, who is the plant manager, sets the SIMs 40 in the plant devices 30 (Step S101). For example, the engineer E sets the SIMs 40 by inserting the card-shaped SIMs 40 into the card slots of the respective plant devices 30 (30A, 30B, 30C).

3-2. Device Setting Information Transmission Processing

The engineer E sets the device setting information in the application server 20 (Step S102). For example, the engineer E sets the device setting information, which is a combination of the device identification information of the plant devices 30 and the communication identification information of the SIMs 40, in the application server 20.

3-3. Application Information Addition Processing

The application server 20 generates the device registration information by adding the application information to the device setting information (Step S103). For example, the application server 20 generates the device registration information by adding the identification information of the application and the hierarchy information of the application as the application information. The application server 20 then stores the generated device registration information in the storage unit 22 (Step S104). For example, the application server 20 stores a combination of the device identification information of the plant devices 30, the communication identification information of the SIMs 40, and the application information as the device registration information in the device registration information storage unit 22a.

3-4. Device Registration Information Transmission Processing

The application server 20 transmits the device registration information to the overall management server 10 (Step S105). For example, the application server 20 transmits a combination of the device identification information of the plant devices 30, the communication identification information of the SIMs 40, and the application information as the device registration information to the overall management server 10.

3-5. Communication Registration Information Generation Processing

The overall management server 10 generates the communication registration information by adding the communication contract information to the device registration information (Step S106). For example, the overall management server 10 generates the communication registration information by adding the contractor information and the communication-specific information as the communication contract information. The overall management server 10 then stores the generated communication registration information in the storage unit 12 (Step S107). For example, the overall management server 10 stores a combination of the communication identification information of the SIMs 40, the communication-specific information of the SIMs 40, the device identification information of the plant devices 30, and the application information for each communication contractor as the communication registration information in the communication registration information storage unit 12a.

4. Effects of First Embodiment

The following finally describes the effects of the first embodiment. The following describes Effects 1 to 3 corresponding to the processing according to the first embodiment.

4-1. Effect 1

First, in the processing according to the first embodiment described above, the overall management server 10 acquires the device registration information in which the device setting information including the device identification information of a device and the communication identification information set for causing the device to perform communication and the application information on the application collecting information transmitted from the device are associated with each other and generates the communication registration information associating the communication contract information indicating the contract state of the communication with the device registration information. Thus, this processing can efficiently manage and grasp the state of use of the SIMs 40.

4-2. Effect 2

Second, in the processing according to the first embodiment described above, the device is the plant device including the communication device and the sensor device installed in the plant and transmitting the plant information acquired from the plant to the designated destination, and the overall management server 10 acquires, from each of a plurality of applications collecting the plant information, the device registration information in which the application information of each of the applications and the device setting information of the device having acquired the plant information are associated with each other and manages each of the applications and the communication registration information associated with each other. Thus, this processing can efficiently manage and grasp the state of use of the SIMs 40 even when a plurality of applications are being used in the plant.

4-3. Effect 3

Third, in the processing according to the first embodiment described above, the communication identification information included in the device setting information is the identification information of the SIM card inserted into the device for causing the device to transmit information to the application. Thus, this processing can efficiently manage and grasp the state of use of the SIMs 40 by managing the information on the devices in which the SIMs 40 are set.

Second Embodiment

The following in a second embodiment describes processing of referring to the communication registration information registered by the registration processing of the first embodiment to identify the application information and the device identification information. The following describes a configuration, a configuration of each apparatus, and a processing procedure of a device management system 100-2 according to the second embodiment in order and finally describes the effects of the second embodiment. For the configurations and processing common to those of the first embodiment, descriptions thereof are omitted.

1. Configuration of Device Management System 100-2

The following describes the configuration of the device management system 100-2 according to the second embodiment in detail using FIG. 7. FIG. 7 is a diagram of a configuration example of the device management system 100-2 according to the second embodiment. The following describes a configuration example of the entire device management system 100-2, processing by the device management system 100-2, and problems with the device management system of the reference technology in order and finally describes the effects of the device management system 100-2.

1-1. Configuration Example of Entire Device Management System 100-2

The device management system 100-2 has the overall management server 10, which is an information providing apparatus, the plant devices 30 (30A, 30B, 30C), and the SIMs 40 (40A, 40B, 40C). The overall management server 10 is built in a cloud environment. The plant devices 30 (30A, 30B, 30C) are installed in a plant and set the respective SIMs 40 (40A, 40B, 40C). The device management system 100-2 illustrated in FIG. 7 may include a plurality of the overall management servers 10.

1-2. Processing by Entire Device Management System 100-2: Device and Application Identification Processing The following describes device and application identification processing identifying the plant device 30 and the application with the SIM 40 not in use set in the device management system 100-2 as described above. Steps S21 to S24 below can be executed in a different order. Some processing at Steps S21 to S24 below may be omitted.

1-2-1. State-of-Use Checking Processing

The engineer E, who is the plant manager, checks the state of use of the SIMs 40 set in the plant devices 30 (Step S21). For example, the engineer E acquires information on the state of use provided by a communication carrier terminal 50 to check the state of use of the SIMs 40 and to acquire the communication-specific information of the SIM 40 not in use.

1-2-2. Communication-Specific Information Transmission Processing

The engineer E transmits the communication-specific information of the SIM 40 not in use to the overall management server 10 (Step S22). For example, the engineer E transmits the phone number of the SIM 40C not in use to the overall management server 10 via a terminal apparatus not illustrated.

1-2-3. Communication Registration Information Reference Processing

The overall management server 10 identifies the web application and the plant device 30 based on the communication-specific information of the SIM 40 by the identification unit 13c (Step S23). For example, the overall management server 10 refers to the registered communication registration information illustrated in FIG. 3, searches for the phone number of the SIM 40C, and identifies Application C and the plant device 30C associated with the phone number.

1-2-4. Identification Result Notification Processing

Based on the identified information, the overall management server 10 provides notification of the application information and the device identification information to the engineer E by the notification unit 13d (Step S24). For example, the overall management server 10 provides notification of the identification information of Application C having been identified and the device identification information of the plant device 30C having been identified to a terminal apparatus of the engineer E (not illustrated).

1-3. Problems with Device Management Processing of Reference Technology

The management of SIMs of the reference technology makes it difficult to efficiently manage and grasp the state of use of the SIMs. For example, there is a following problem: the plant devices, the web applications, and the communication contract information are separately managed, and thus to grasp the relation of such information, it is necessary to investigate the relation between a plurality of pieces of information, which takes time and effort.

1-4. Effects of Device Management System 100-2

The following describes an outline of the device management system 100-2 according to the second embodiment and further describes the effects of the device management system 100-2.

1-4-1. Outline of Device Management System 100-2

First, the engineer E, who is the plant manager, checks the state of use of the SIMs 40 set in the plant devices 30. Second, the engineer E transmits the communication-specific information of the SIM 40 not in use to the overall management server 10. Third, the overall management server 10 identifies the web application and the plant device 30 based on the communication-specific information of the SIM 40. Fourth, the overall management server 10 provides notification of the application information and the device identification information to the engineer E based on the identified information.

1-4-2. Effects of Device Management System 100-2

The communication carrier and the plant manager can monitor, from the phone number of the SIM 40, its operating state and can thus identify the SIM 40 not in use and easily identify which SIM 40 is being used in which web application and plant device 30. That is, from the information on the SIMs 40, the related web applications and the set plant devices 30 can be managed. As described above, the device management system 100-2 can efficiently manage and grasp the state of use of the SIMs 40.

2. Configuration of Each Apparatus of Device Management System 100-2

The following describes a functional configuration of the overall management server 10 of the device management system 100-2 illustrated in FIG. 7. A configuration example of the entire device management system 100-2 and configuration examples of the plant devices 30, the SIMs 40, and the application server 20, which is not illustrated, are the same as those of the first embodiment illustrated in FIG. 2, and thus descriptions thereof are omitted.

2-1. Configuration Example of Overall Management Server 10

The overall management server 10 has the communication unit 11, the storage unit 12, and the controller 13. The overall management server 10 may have an input unit (for example, a keyboard, a mouse, or the like) receiving various types of operations from a manager of the device management system 100-2 and a display unit (for example, a liquid crystal display or the like) for displaying various types of information.

2-1-1. Communication Unit 11

The communication unit 11 is responsible for data communication with other apparatuses. The communication unit 11 performs the same processing as that of the first embodiment illustrated in FIG. 2, and thus a description thereof is omitted.

2-1-2. Storage Unit 12

The storage unit 12 stores therein various types of information referred to when the controller 13 operates and various types of information acquired when the controller 13 operates. The storage unit 12 performs the same processing

2-1-3. Controller 13

The controller 13 is responsible for the control of the entire overall management server 10. The controller 13 has the acquisition unit 13a, the generation unit 13b, the identification unit 13c, and the notification unit 13d as in FIG. 2. The controller 13 can be implemented by, for example, an electronic circuit such as a CPU or a MPU or an integrated circuit such as an ASIC or an FPGA.

2-1-3-1. Acquisition Unit 13a

The acquisition unit 13a acquires various types of information. The details of the processing by the acquisition unit 13a are common to those of the first embodiment described above, and thus a description thereof is omitted.

2-1-3-2. Generation Unit 13b

The generation unit 13b generates various types of information. The details of the processing by the generation unit 13b are common to those of the first embodiment described above, and thus a description thereof is omitted.

2-1-3-3. Identification Unit 13c

When receiving an inquiry about at least one of the device, the communication contract information, and the application, the identification unit 13c identifies information for the inquiry by referring to the communication registration information stored in the storage unit 12. The communication registration information is information with which the communication-specific information indicated by the communication contract information of the SIMs 40 is associated. For example, when receiving the communication-specific information indicated by the communication contract information of a certain SIM 40, the identification unit 13c identifies at least either the device identification information or the application information associated with the communication-specific information of the certain SIM 40 by referring to the communication registration information stored in the storage unit 12.

To describe it for a specific example, the identification unit 13c receives the phone number "333-3333-3333" of the SIM 40C not in use from the terminal apparatus of the engineer E, who is the plant manager, and identifies related Web Application C and the plant device 30C in which the SIM 40C is set by referring to the communication registration information of the communication registration information storage unit 12a illustrated in FIG. 3.

2-1-3-4. Notification Unit 13d

The notification unit 13d provides notification of an answer based on an identification result by the identification unit 13c to an inquiry source. For example, the notification unit 13d provides notification of an answer including at least either the device identification information of the identified device or the identified application information. To describe it for a specific example, the notification unit 13d provides notification of the application identification information "Application C" of Web Application C related to the SIM 40C and the device identification information "Plant Device C" of the plant device 30C in which the SIM 40C is set, which have been identified by the identification unit 13c, to the terminal apparatus of the engineer E, who is the plant manager. A specific example of a display screen output by the notification unit 13d will be described in (2-2. Specific Example of Display Screen) of the second embodiment.

2-2. Specific Example of Display Screen

Figure 8:
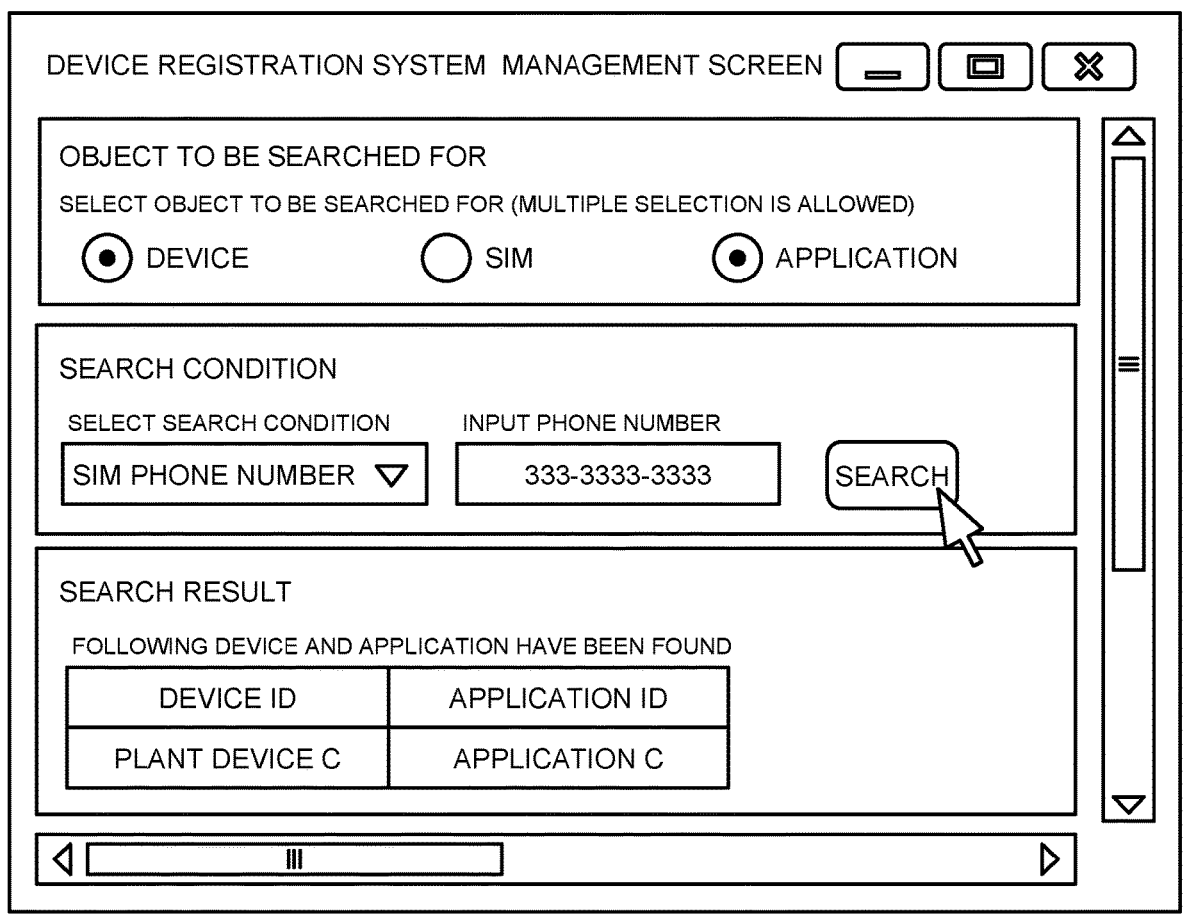
FIG. 8 is a diagram of a specific example of a display screen of a device search result according to the second embodiment.

The following describes the specific example of the display screen output by the notification unit 13d of the overall management server 10 using FIG. 8. FIG. 8 is a diagram of the specific example of the display screen of a device search result according to the second embodiment. The following describes "object to be searched for," "search condition," and "search result" on the management screen of "device registration system" in this order.

2-2-1. Object to be Searched for

As illustrated in FIG. 8, the overall management server 10 refers to the registered communication registration information and displays an object to be searched for, which is an object to be identified, in a selectable manner. In the example in FIG. 8, the overall management server 10 displays "device," which is the registered plant device 30, "SIM," which is the registered SIM 40, and "application," which is the registered web application, as the object to be searched for in a selectable manner by a radio button each. The overall management server 10 can also display the management screen for each contractor of the SIMs 40. In the example in FIG. 8, "device" and "application" are selected.

2-2-2. Search Condition

As illustrated in FIG. 8, the overall management server 10, in accordance with the object selected as the object to be searched for, displays a search condition to be input in order to search for the object. In the example in FIG. 8, the overall management server 10 displays a pull-down menu from which "SIM phone number" can be selected as a type of the search condition and a text box corresponding to the type of the search condition. The overall management server 10 starts search processing by the phone number "333-3333-3333" of the SIM 40C being input to the text box and the "search" button being clicked on.

2-2-3. Search Result

As illustrated in FIG. 8, the overall management server 10 performs search and displays a search result, which is information on the identified object to be searched for. In the example in FIG. 8, the overall management server 10 displays, as a search result corresponding to the SIM 40C the phone number of which has been input, "Plant Device C," which is the device identification information "device ID" of the plant device 30C, and "Application C," which is the identification information "application ID" of the web application collecting information transmitted by the plant device 30C.

2-2-4. Other Display

Furthermore, the overall management server 10 can display more detailed information in response to operations by a user of a terminal apparatus to which the display screen is output. For example, when "Plant Device C" is clicked on in the above search result, the overall management server 10 may display information on the device type (sensor device, gateway device, or control device) of Plant Device C and/or the plant in which it is installed. When "Application C" is clicked on in the above search result, the overall management server 10 may display the application hierarchy information indicating the hierarchical structure of Application C.

3. Processing Procedure of Device Management System 100-2

Figure 9:
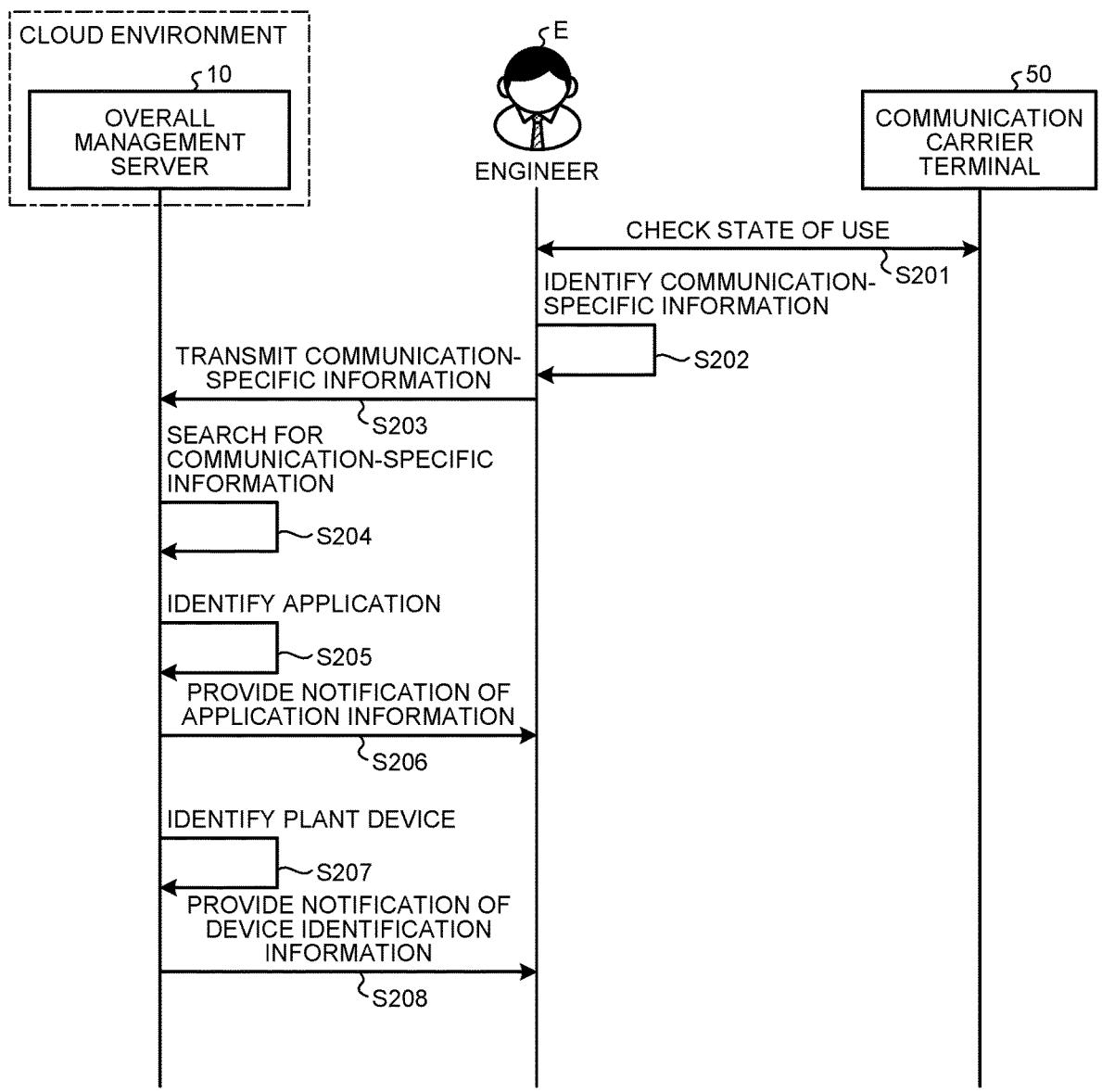
FIG. 9 is a sequence diagram of an example of a procedure of device management processing according to the second embodiment.

The following describes the processing procedure of the device management system 100-2 according to the second embodiment using FIG. 9. FIG. 9 is a sequence diagram of an example of the procedure of device management processing according to the second embodiment. The processing at Steps S201 to S208 below can be executed in a different order. Some processing at Steps S201 to S208 below may be omitted.

3-1. State-of-Use Checking Processing

The engineer E, who is the plant manager, checks the state of use of the SIMs 40 set in the plant devices 30 (Step S201). For example, the engineer E acquires the information on the state of use provided by the communication carrier terminal 50 to check the state of use of the SIMs 40. The engineer E then identifies the SIMs 40 not in use (Step S202). For example, the engineer E identifies the phone number, which is the communication-specific information, of the SIMs 40 not in use.

3-2. Communication-Specific Information Transmission Processing

The engineer E transits the communication-specific information of the SIMS 40 to the overall management server 10 (Step S203). For example, the engineer E transmits the phone number, which is the communication-specific information, of the identified SIM 40, to the overall management server 10.

3-3. Communication Registration Information Reference Processing

The overall management server 10 searches for the communication-specific information of the SIM 40 (Step S204). For example, the overall management server 10 refers to the registered communication registration information and searches for the phone number, which is the communication-specific information, of the SIM 40.

Next, the overall management server 10 identifies the web application (Step S205). For example, the overall management server 10 identifies the web application associated with the phone number, which is the communication-specific information, of the SIM 40.

The overall management server 10 identifies the plant device 30 (Step S207). For example, the overall management server 10 identifies the plant device 30 associated with the phone number, which is the communication-specific information, of the SIM 40.

3-4. Identification Result Notification Processing

The overall management server 10 provides notification of the application information to the engineer E (Step S206). For example, the overall management server 10 provides notification of the identification information and the hierarchy information of the identified web application to the engineer E.

The overall management server 10 provides notification of the device identification information to the engineer E (Step S208). For example, the overall management server 10 provides notification of the identification information of the identified plant device 30 to the engineer E.

4. Effects of Second Embodiment

The following finally describes the effects of the second embodiment. The following describes Effects 1 and 2 corresponding to the processing according to the second embodiment.

4-1. Effect 1

First, in the processing according to the embodiment described above, the generated communication registration information is retained, and when an inquiry about the device, the communication contract information, or the application is received, the information for the inquiry is identified by referring to the retained communication registration information, and notification of an answer based on an identification result is provided to an inquiry source. Thus, this processing can efficiently manage and grasp the state of use of the SIMs by managing the relation among the devices, the SIMs, and the applications.

4-2. Effect 2

Second, in the processing according to the embodiment described above, when the communication-specific information indicated by the communication contract information of a certain SIM is received, the device in which the SIM indicated by the communication-specific information is set and the application in which the communication-specific information is registered are identified, and notification of an answer including the device identification information of the identified device and the application information of the identified application is provided. Thus, this processing can efficiently manage and grasp the state of use of the SIMs by identifying the relation between the devices and the applications from the information on the SIMs.

Third Embodiment

The following in a third embodiment describes processing of referring to the communication registration information registered by the registration processing of the first embodiment to identify the communication identification information. The following describes a configuration, a configuration of each apparatus, and a processing procedure of a device management system 100-3 according to the third embodiment in order and finally describes the effects of the third embodiment. For the configurations and processing common to those of the first embodiment and the second embodiment, descriptions thereof are omitted.

1. Configuration of Device Management System 100-3

Figure 10:
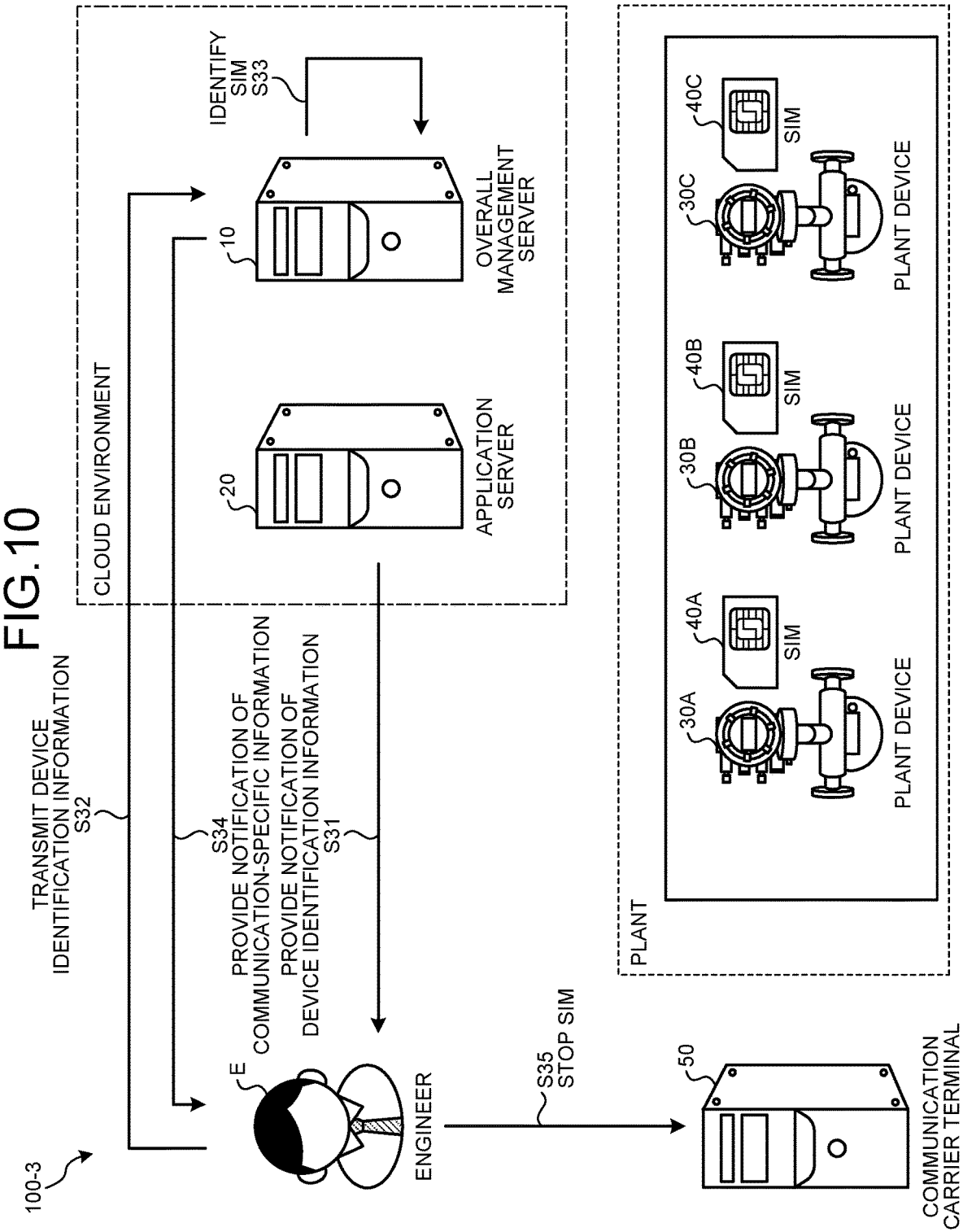
FIG. 10 is a diagram of a configuration example of a device management system according to a third embodiment.

The following describes the configuration of the device management system 100-3 according to the third embodiment in detail using FIG. 10. FIG. 10 is a diagram of a configuration example of the device management system 100-3 according to the third embodiment. The following describes a configuration example of the entire device management system 100-3, processing by the device management system 100-3, and problems with the device management system of the reference technology in order and finally describes the effects of the device management system 100-3.

1-1. Configuration Example of Entire Device Management System 100-3

The device management system 100-3 has the overall management server 10, which is an information providing apparatus, the application server 20, which is an information management apparatus, the plant devices 30 (30A, 30B, 30C), and the SIMs 40 (40A, 40B, 40C). The overall management server 10 and the application server 20 are built in a cloud environment. The plant devices 30 (30A, 30B, 30C) are installed in a plant and set the respective SIMs 40 (40A, 40B, 40C). The device management system 100-3 illustrated in FIG. 10 may include a plurality of the overall management servers 10 or a plurality of the application servers 20.

1-2. Processing by Entire Device Management System 100-3: SIM Identification Processing The following describes SIM identification processing identifying the communication identification information of the SIM 40 set in the plant device 30 not in use in the device management system 100-3 as described above. Steps S31 to S35 below can be executed in a different order. Some processing at Steps S31 to S35 below may be omitted.

1-2-1. Device Identification Information Notification Processing

The application server 20 transmits the device identification information to the engineer E, who is the plant manager (Step S31). For example, the application server 20 provides notification of the device identification information of the plant devices 30 in response to a request transmitted from the terminal apparatus of the engineer E (not illustrated).

1-2-2. Device Identification Information Transmission Processing

The engineer E transmits the device identification information of the plant device 30 not in use to the overall management server 10 (Step S32). For example, the engineer E transmits the device identification information of the plant device 30A not in use to the overall management server 10 via the terminal apparatus not illustrated.

1-2-3. Communication Registration Information Reference Processing

The overall management server 10 identifies the communication identification information of the SIMs 40 based on the device identification information of the plant devices 30 (Step S33). For example, the overall management server 10 refers to the registered communication registration information, searches for the device identification information of the plant device 30A, and identifies the SIM 40A associated with the device identification information.

1-2-4. Identification Result Notification Processing

Based on the identified information, the overall management server 10 provides notification of the communication-specific information to the engineer E (Step S34). For example, the overall management server 10 provides notification of the phone number of the identified SIM 40A to the terminal apparatus of the engineer E (not illustrated).

1-2-5. SIM Stopping Processing

Based on the information the notification of which has been provided, the SIM 40 associated with the device not in use is not in use, and thus the engineer E stops the SIM 40 via the communication carrier terminal 50 performing SIM management (Step S35). For example, the engineer E transmits the phone number of the identified SIM 40A to the communication carrier terminal 50 to cancel the communication contract with the SIM 40A.

1-3. Problems with Device Management Processing of Reference Technology

The management of SIMs of the reference technology makes it difficult to efficiently manage and grasp the state of use of the SIMs. For example, the plant manager cannot grasp the phone number of the SIMs in the plant, designates the identification information of the plant device to stop the plant device, and may thus want to identify the SIM from the identification information of the plant device when stopping the plant device. Meanwhile, if management is done for each communication service, it is difficult to identify the relation between the plant devices and the SIMs, and thus there is a problem in that the plant device is stopped but the contract with the SIM continues, thus continuing billing.

1-4. Effects of Device Management System 100-3

The following describes an outline of the device management system 100-3 according to the third embodiment and further describes the effects of the device management system 100-3.

1-4-1. Outline of Device Management System 100-3

First, the application server 20 transmits the device identification information to the engineer E, who is the plant manager. Second, the engineer E transmits the device identification information of the plant device 30 not in use to the overall management server 10. Third, the overall management server 10 identifies the SIM 40 based on the device identification information of the plant device 30. Fourth, the overall management server 10 provides notification of the communication-specific information to the engineer E based on the identified information. Fifth, the engineer E stops the SIM 40 based on the information the notification of which has been provided.

1-4-2. Effects of Device Management System 100-3

The plant manager can grasp the state of use of the SIMs 40, grasp whether there is any SIM 40 not in use by any web application, and save a wasteful use charge for the SIM 40 by stopping the SIM 40. In addition, the communication carrier can identify the SIM 40 the communication contract of which will expire and can confirm with the plant manager the decision to continue use and the like. As described above, the device management system 100-3 can efficiently grasp the state of use of the SIMs 40.

2. Configuration of Each Apparatus of Device Management System 100-3

The following describes a functional configuration of the overall management server 10 of the device management system 100-3 illustrated in FIG. 10. A configuration example of the entire device management system 100-3 and configuration examples of the application server 20, the plant devices 30, and the SIMs 40 are the same as those of the first embodiment illustrated in FIG. 2, and thus descriptions thereof are omitted.

2-1. Configuration Example of Overall Management Server 10

The overall management server 10 has the communication unit 11, the storage unit 12, and the controller 13. The overall management server 10 may have an input unit (for example, a keyboard, a mouse, or the like) receiving various types of operations from a manager of the device management system 100-3 and a display unit (for example, a liquid crystal display or the like) for displaying various types of information.

2-1-1. Communication Unit 11

The communication unit 11 is responsible for data communication with other apparatuses. The communication unit 11 performs the same processing as that of the first embodiment illustrated in FIG. 2, and thus a description thereof is omitted.

2-1-2. Storage Unit 12

The storage unit 12 stores therein various types of information referred to when the controller 13 operates and various types of information acquired when the controller 13 operates. The storage unit 12 performs the same processing as that of the first embodiment illustrated in FIG. 2, and thus a description thereof is omitted.

2-1-3. Controller 13

The controller 13 is responsible for the control of the entire overall management server 10. The controller 13 has the acquisition unit 13*a*, the generation unit 13*b*, the identification unit 13*c*, and the notification unit 13*d* as in FIG. 2. The controller 13 can be implemented by, for example, an electronic circuit such as a CPU or a MPU or an integrated circuit such as an ASIC or an FPGA.

2-1-3-1. Acquisition Unit 13a

The acquisition unit 13*a* acquires various types of information. The details of the processing by the acquisition unit 13*a* are common to those of the first embodiment described above, and thus a description thereof is omitted.

2-1-3-2. Generation Unit 13b

The generation unit 13*b* generates various types of information. The details of the processing by the generation unit 13*b* are common to those of the first embodiment described above, and thus a description thereof is omitted.

2-1-3-3. Identification Unit 13c

When receiving an inquiry about at least one of the device, the communication contract information, and the application, the identification unit 13*c* identifies information for the inquiry by referring to the communication registration information stored in the storage unit 12. The communication registration information is information with which the communication-specific information indicated by the communication contract information of the SIMs 40 is associated. For example, when receiving the device identification information of a certain device by referring to the communication registration information stored in the storage unit 12, the identification unit 13*c* identifies the communication identification information of a certain SIM 40 associated with the received device identification information.

To describe it for a specific example, the identification unit 13*c* receives the device identification information "Plant Device A" of the plant device 30A not in use from the terminal apparatus of the engineer E, who is the plant manager, and identifies the certain SIM 40A set in the plant device 30A by referring to the communication registration information storage unit 12*a*.

2-1-3-4. Notification Unit 13d

The notification unit 13*d* provides notification of an answer based on an identification result by the identification unit 13*c* to an inquiry source. For example, the notification unit 13*d* provides notification of an answer including the communication-specific information indicated by the communication contract information associated with the communication identification information of the identified SIM 40. To describe it for a specific example, the notification unit 13*d* provides notification of the phone number "333-3333-3333," which is the communication-specific information, of the SIM 40A set in the plant device 30A identified by the identification unit 13*c* to the terminal apparatus of the engineer E, who is the plant manager. A specific example of a display screen output by the notification unit 13*d* will be described in (2-2. Specific Example of Display Screen) of the third embodiment.

2-2. Specific Example of Display Screen

Figure 11:
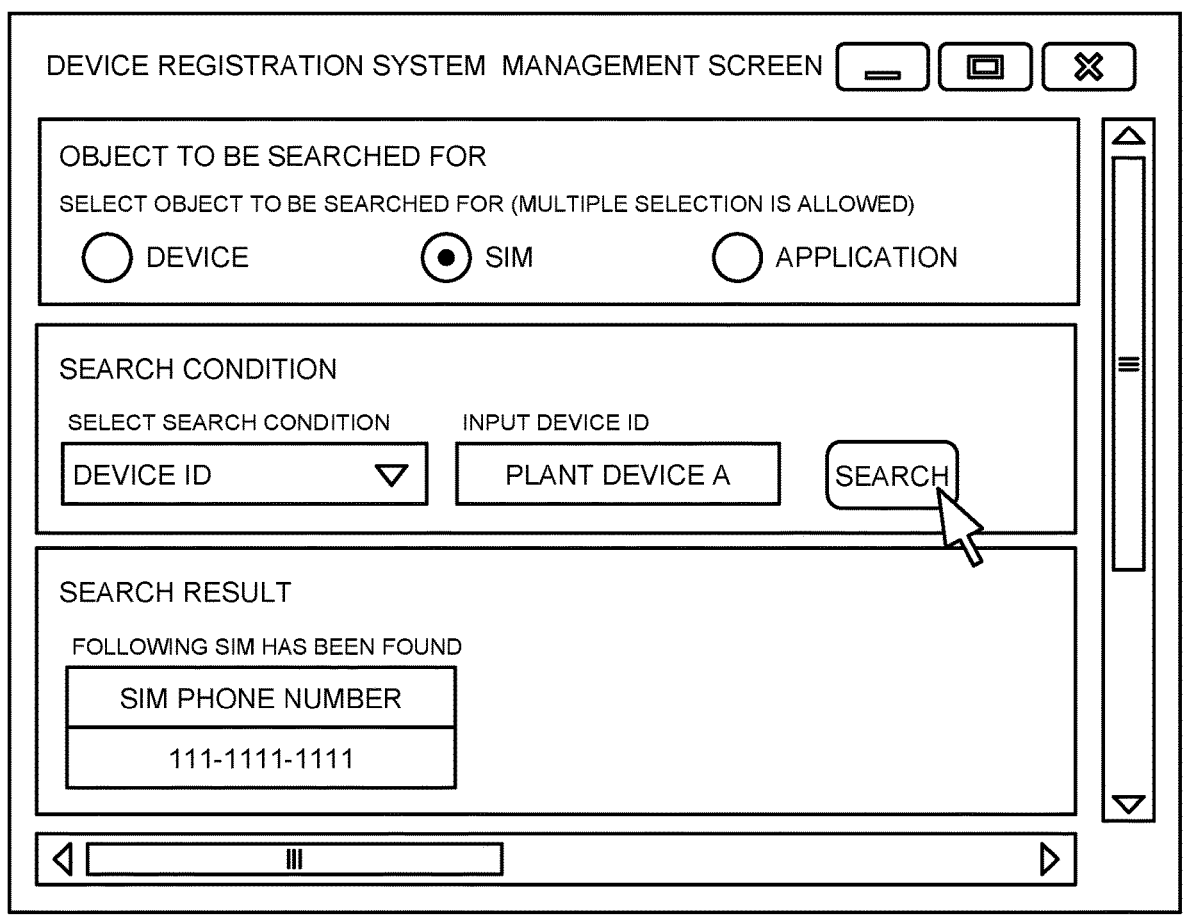
FIG. 11 is a diagram of a specific example of a display screen of a SIM search result according to the third embodiment.

The following describes the specific example of the display screen output by the notification unit 13*d* of the overall management server 10 using FIG. 11. FIG. 11 is a diagram of the specific example of the display screen of a search result of the SIM 40 according to the third embodiment. The following describes "object to be searched for," "search condition," and "search result" on the management screen of "device registration system" in this order.

2-2-1. Object to be Searched for

As illustrated in FIG. 11, the overall management server 10 refers to the registered communication registration information and displays an object to be searched for, which is an object to be identified, in a selectable manner. In the example in FIG. 11, the overall management server 10 displays "device," which is the registered plant device 30, "SIM," which is the registered SIM 40, and "application," which is the registered web application, as the object to be searched for in a selectable manner by a radio button. The overall management server 10 can also display the management screen for each contractor of the SIMs 40. In the example in FIG. 11, "SIM" is selected.

2-2-2. Search Condition

As illustrated in FIG. 11, the overall management server 10, in accordance with the object selected as the object to be searched for, displays a search condition to be input in order to search for the object. In the example in FIG. 11, the overall management server 10 displays a pull-down menu from which "device ID" can be selected as a type of the search condition and a text box corresponding to the type of the search condition. The overall management server 10 starts search processing by the device identification information "Plant Device A" of the plant device 30A being input to the text box and the "search" button being clicked on.

2-2-3. Search Result

As illustrated in FIG. 11, the overall management server 10 performs search and displays a search result, which is information on the identified object to be searched for. In the example in FIG. 11, the overall management server 10 displays, as a search result corresponding to the plant device 30A the device identification information of which has been input, "111-1111-1111," which is the communication-specific information "SIM phone number" of the SIM 40A.

2-2-4. Other Display

Furthermore, the overall management server 10 can display more detailed information in response to operations by a user of a terminal apparatus to which the display screen is output. For example, when "111-1111-1111" is clicked on in the above search result, the overall management server 10 may display a screen to cancel the communication contract with the SIM 40A.

3. Processing Procedure of Device Management System 100-3

Figure 12:
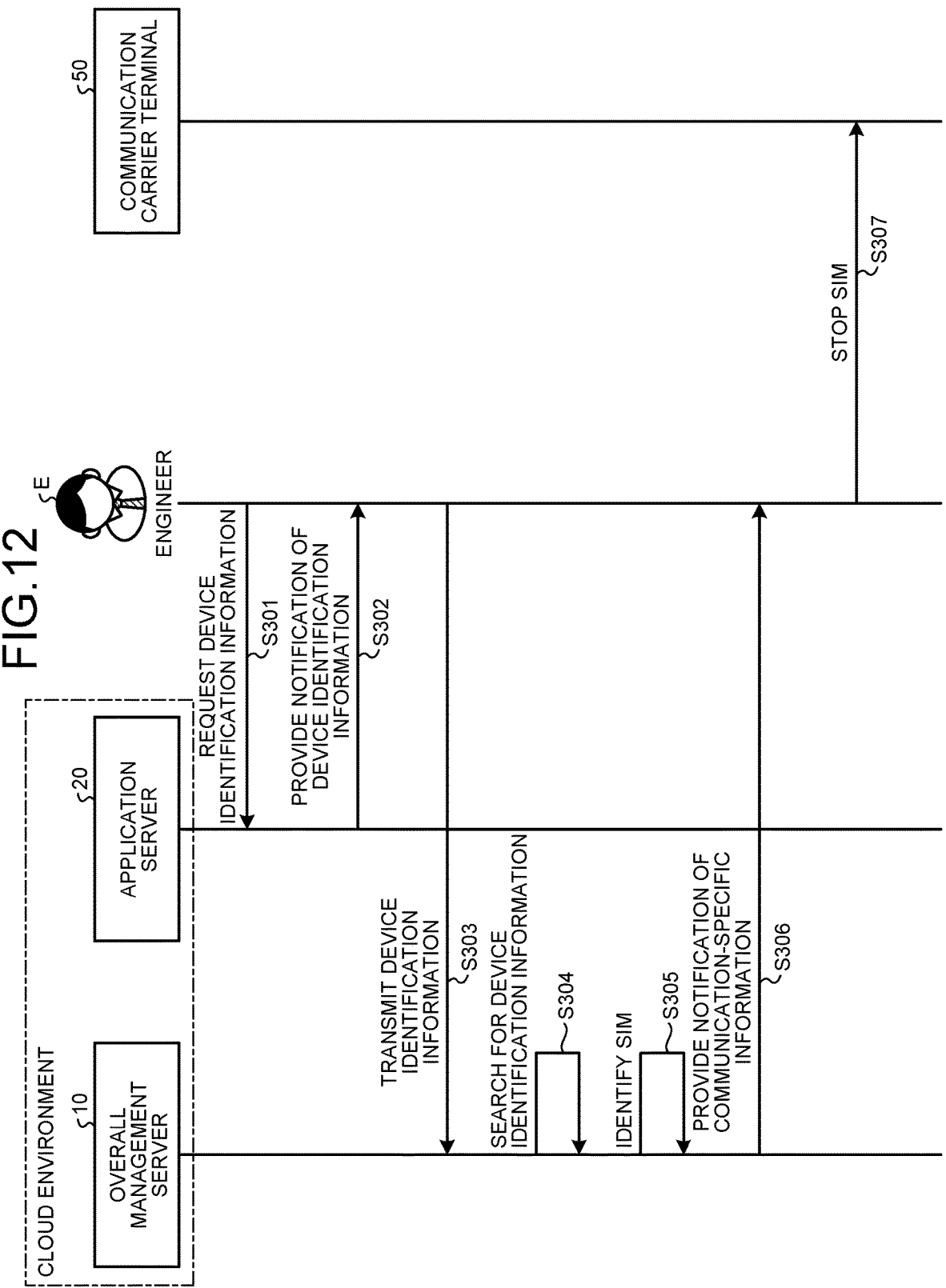
FIG. 12 is a sequence diagram of an example of a procedure of device management processing according to the third embodiment.

The following describes the processing procedure of the device management system 100-3 according to the third embodiment using FIG. 12. FIG. 12 is a sequence diagram of an example of the procedure of device management processing according to the third embodiment. The processing at Steps S301 to S307 below can be executed in a different order. Some processing at Steps S301 to S307 below may be omitted.

3-1. Device Identification Information Notification Processing

The engineer E, who is the plant manager, requests the device identification information from the application server 20 (Step S301). For example, the engineer E requests the device identification information of the plant device 30 not in use. The application server 20 then provides notification of the device identification information to the engineer E (Step S302). For example, the application server 20 provides notification of the device identification information of the plant device 30 not in use to the engineer E. The engineer E can also request the identification information from the overall management server 10.

3-2. Device Identification Information Transmission Processing

The engineer E transmits the device identification information to the overall management server 10 (Step S303). For example, the engineer E transmits the device identification information of the plant device 30 not in use to the overall management server 10.

3-3. Communication Registration Information Reference Processing

The overall management server 10 searches for the device identification information (Step S304). For example, the overall management server 10 refers to the registered communication registration information to search for the device identification information of the plant device 30.

Next, the overall management server 10 identifies the SIM 40 (Step S305). For example, the overall management server 10 identifies the SIM 40 associated with the device identification information of the plant device 30.

3-4. Identification Result Notification Processing

The overall management server 10 provides notification of the communication-specific information of the SIM 40 to the engineer E (Step S306). For example, the overall management server 10 provides notification of the phone number, which is the communication-specific information, of the identified SIM 40 to the engineer E.

3-5. SIM Stopping Processing

The engineer E stops the SIM 40 (Step S307). For example, the engineer E cancels the communication contract with the SIM 40 by transmitting the phone number of the SIM 40 not in use to the communication carrier via the terminal apparatus not illustrated.

4. Effects of Third Embodiment

The following finally describes the effects of the third embodiment. The following describes Effects 1 and 2 corresponding to the processing according to the third embodiment.

4-1. Effect 1

First, in the processing according to the embodiment described above, the generated communication registration information is retained, and when an inquiry about the device, the communication contract information, or the application is received, the information for the inquiry is identified by referring to the retained communication registration information, and notification of an answer based on an identification result is provided to an inquiry source. Thus, this processing can efficiently manage and grasp the state of use of the SIMs 40 by managing the relation among the devices, the SIMs 40, and the applications.

4-2. Effect 2

Second, in the processing according to the embodiment described above, when the device identification information of a certain device is received, the SIM 40 associated with the received device identification information is identified, and notification of an answer including the communication-specific information indicated by the communication contract information of the identified SIM 40 is provided. Thus, this processing can efficiently manage and grasp the state of use of the SIMs 40 by identifying the relation with the SIMs 40 from the information on the devices.

Fourth Embodiment

The following in a fourth embodiment describes processing of referring to the communication registration information registered by the registration processing of the first embodiment to provide notification of an alarm when the object to be searched for cannot be identified. The following describes a configuration, a configuration of each apparatus, and a processing procedure of a device management system 100-4 according to the fourth embodiment in order and finally describes the effects of the fourth embodiment. For the configurations and processing common to those of the first to third embodiments, descriptions thereof are omitted.

1. Configuration of Device Management System 100-4

Figure 13:
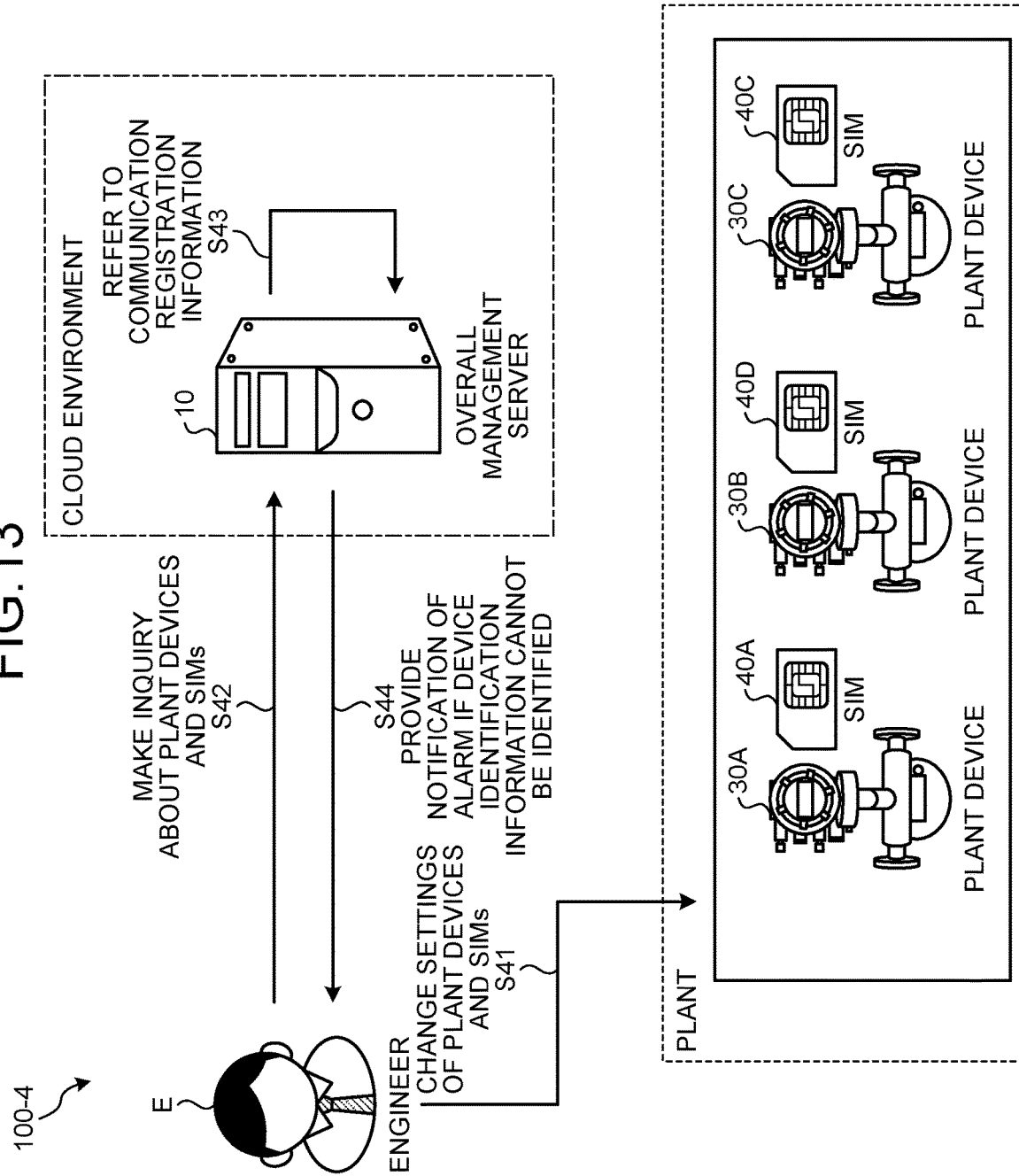
FIG. 13 is a diagram of a configuration example of a device management system according to a fourth embodiment.

The following describes the configuration of the device management system 100-4 according to the fourth embodiment in detail using FIG. 13. FIG. 13 is a diagram of a configuration example of the device management system 100-4 according to the fourth embodiment. The following describes a configuration example of the entire device management system 100-4 and processing by the device management system 100-4 in order and finally describes the effects of the device management system 100-4.

1-1. Configuration Example of Entire Device Management System 100-4

The device management system 100-4 has the overall management server 10, which is an information providing apparatus, the plant devices 30 (30A, 30B, 30C), and the SIMs 40 (40A, 40D, 40C). The overall management server 10 is built in a cloud environment. The plant devices 30 (30A, 30B, 30C) are installed in a plant and set the respective SIMs 40 (40A, 40D, 40C). The device management system 100-4 illustrated in FIG. 13 may include a plurality of the overall management servers 10.

1-2. Processing by Entire Device Management System 100-4: Alarm Notification Processing The following describes alarm notification processing along with a change in the setting of the plant device 30 in the device management system 100-4 as described above. Steps S41 to S44 below can be executed in a different order. Some processing at Steps S41 to S44 below may be omitted.

1-2-1. Plant Device Setting Change Processing

The engineer E changes the settings of the plant devices 30 and the SIMs 40 (Step S41). For example, the engineer E removes the SIM 40B having been inserted into the plant device 30B and inserts the SIM 40D thereinto instead.

1-2-2. Communication Registration Information Inquiry Processing

The engineer E makes an inquiry to the overall management server 10 about the plant devices 30 and the SIMs 40 (Step S42). For example, the engineer E transmits the communication identification information of all the SIMs 40 (40A, 40D, 40C) set in the plant devices 30 in the plant to the overall management server 10 in order to check where the combination of the plant devices 30 and the SIMs 40 has been changed.

1-2-3. Communication Registration Information Reference Processing

The overall management server 10 refers to the communication registration information (Step S43). For example, the overall management server 10 refers to the registered communication registration information, searches for the transmitted communication identification information of the SIMs 40, and identifies the device identification information with which the communication identification information is associated. That is, the overall management server 10 identifies the device identification information for the SIM 40A and the SIM 40C. On the other hand, the overall management server 10 cannot identify the device identification information for the SIM 40D because the communication registration information of the plant device 30B and the SIM 40D is not registered.

1-2-4. Identification Result Notification Processing

The overall management server 10 provides notification of the device identification information or an alarm to the engineer E based on the identified information (Step S44). For example, for the SIM 40A and the SIM 40C among the transmitted SIMs 40, the overall management server 10 provides notification of the device identification information of the plant device 30A and the plant device 30C, respectively, indicated by the communication registration information. On the other hand, for the SIM 40D among the transmitted SIMs 40, the overall management server 10 provides notification of an answer indicating that the communication registration information is not registered as an alarm. In this process, the overall management server 10 may provide notification of an answer prompting registration after the setting change.

1-3. Effects of Device Management System 100-4

The following describes an outline of the device management system 100-4 according to the fourth embodiment and further describes the effects of the device management system 100-4.

1-3-1. Outline of Device Management System 100-4

First, the engineer E changes the settings of the plant devices 30 and the SIMs 40. Second, the engineer E makes an inquiry to the overall management server 10 about the plant devices 30 and the SIMs 40. Third, the overall management server 10 searches for the communication registration information. Fourth, the overall management server 10 provides notification of the device identification information or an alarm to the engineer E based on the identified information.

1-3-2. Effects of Device Management System 100-4

Even when changing the settings of the plant devices 30 during a plant maintenance or the like, the plant manager can grasp the combination of the plant devices 30 and the SIMs 40 after the change. In addition, even when the plant devices 30 are incorrectly set, the plant manager can promptly perform resetting of the plant devices 30 by receiving alarm notification.

2. Configuration of Each Apparatus of Device Management System 100-4

The following describes a functional configuration of the overall management server 10 of the device management system 100-4 illustrated in FIG. 13. A configuration example of the entire device management system 100-4 and configuration examples of the application server 20, the plant devices 30, and the SIMs 40 are the same as those of the first embodiment illustrated in FIG. 2, and thus descriptions thereof are omitted.

2-1. Configuration Example of Overall Management Server 10

The overall management server 10 has the communication unit 11, the storage unit 12, and the controller 13. The overall management server 10 may have an input unit (for example, a keyboard, a mouse, or the like) receiving various types of operations from a manager of the device management system 100-4 and a display unit (for example, a liquid crystal display or the like) for displaying various types of information.

2-1-1. Communication Unit 11

The communication unit 11 is responsible for data communication with other apparatuses. The communication unit 11 performs the same processing as that of the first embodiment illustrated in FIG. 2, and thus a description thereof is omitted.

2-1-2. Storage Unit 12

The storage unit 12 stores therein various types of information referred to when the controller 13 operates and various types of information acquired when the controller 13 operates. The storage unit 12 performs the same processing as that of the first embodiment illustrated in FIG. 2, and thus a description thereof is omitted.

2-1-3. Controller 13

The controller 13 is responsible for the control of the entire overall management server 10. The controller 13 has the acquisition unit 13*a*, the generation unit 13*b*, the identification unit 13*c*, and the notification unit 13*d* as in FIG. 2. The controller 13 can be implemented by, for example, an electronic circuit such as a CPU or a MPU or an integrated circuit such as an ASIC or an FPGA.

2-1-3-1. Acquisition Unit 13*a*

The acquisition unit 13*a* acquires various types of information. The details of the processing by the acquisition unit 13*a* are common to those of the first embodiment described above, and thus a description thereof is omitted.

2-1-3-2. Generation Unit 13*b*

The generation unit 13*b* generates various types of information. The details of the processing by the generation unit 13*b* are common to those of the first embodiment described above, and thus a description thereof is omitted.

2-1-3-3. Identification Unit 13*c*

When receiving an inquiry about at least one of the device, the communication contract information, and the application, the identification unit 13*c* identifies information for the inquiry by referring to the storage unit 12.

2-1-3-4. Notification Unit 13*d*

The notification unit 13*d* provides notification of an answer based on an identification result by the identification unit 13*c* to an inquiry source. For example, the notification unit 13*d* refers to the communication registration information stored in the storage unit 12 and, when the information for the inquiry is not identified, provides notification of an answer indicating that at least one of information on the device, the communication contract information, and the application is unregistered. To describe it for a specific example, when the phone number "444-4444-4444," which is the communication-specific information, of the SIM 40D about which the inquiry has been received is not identified, the notification unit 13*d* provides notification of "SIM 40D is unregistered. Do you register it?" or the like to the terminal apparatus of the engineer E, who is the plant manager. A specific example of a display screen output by the notification unit 13*d* will be described in (2-2. Specific Example of Display Screen) of the fourth embodiment.

2-2. Specific Example of Display Screen

Figure 14:
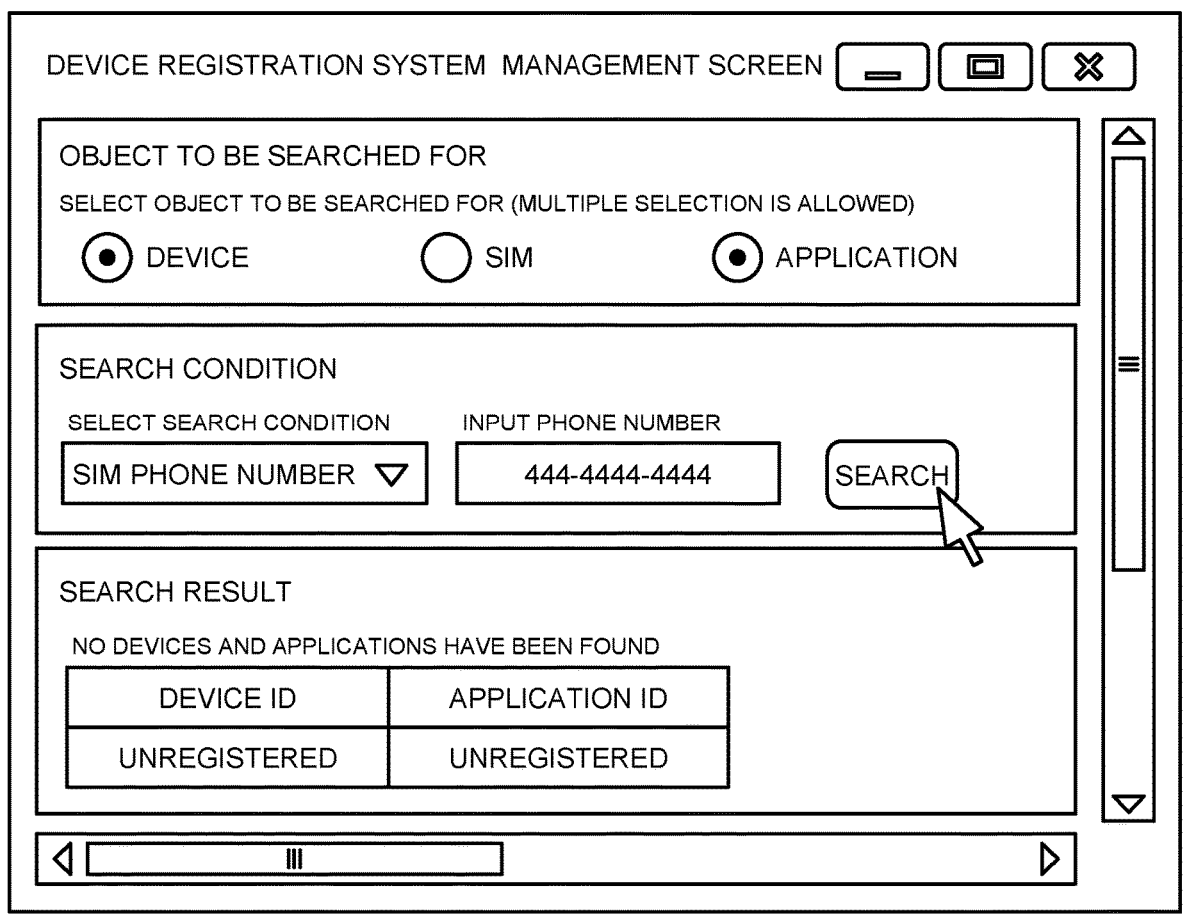
FIG. 14 is a diagram of a specific example of a display screen of a device search result according to the fourth embodiment.

The following describes the specific example of the display screen output by the notification unit 13*d* of the overall management server 10 using FIG. 14. FIG. 14 is a diagram of the specific example of the display screen of a device search result according to the fourth embodiment. The following describes "object to be searched for," "search condition," and "search result" on the management screen of "device registration system" in this order.

2-2-1. Object to be Searched for

As illustrated in FIG. 14, the overall management server 10 refers to the registered communication registration information and displays an object to be searched for, which is an object to be identified, in a selectable manner. In the example in FIG. 14, the overall management server 10 displays "device," which is the registered plant device 30, "SIM," which is the registered SIM 40, and "application," which is the registered web application, as the object to be searched for in a selectable manner by a radio button. In the example in FIG. 14, "device" and "application" are selected.

2-2-2. Search Condition

As illustrated in FIG. 14, the overall management server 10, in accordance with the object selected as the object to be searched for, displays a search condition to be input in order to search for the object. In the example in FIG. 14, the overall management server 10 displays a pull-down menu from which "SIM phone number" can be selected as a type of the search condition and a text box corresponding to the type of the search condition. The overall management server 10 starts search processing by the phone number "444-4444-

4444" of the SIM 40D being input to the text box and the "search" button being clicked on.

2-2-3. Search Result

As illustrated in FIG. 14, the overall management server 10 performs search and displays a search result, which is information on the identified object to be searched for. In the example in FIG. 14, the overall management server 10 displays, as a search result corresponding to the SIM 40D the phone number of which has been input, the device identification information "device ID" of the plant devices 30 being "unregistered" and the identification information "application ID" of the web applications being "unregistered." That is, the overall management server 10 provides notification of the fact that the device setting information and the communication registration information corresponding to the SIM 40D have not been registered.

2-2-4. Other Display

Furthermore, the overall management server 10 can display more detailed information in response to operations by a user of a terminal apparatus to which the display screen is output. For example, when "unregistered" is clicked on in the above search result, the overall management server 10 may display a screen to perform resetting of the SIM 40D.

3. Processing Procedure of Device Management System 100-4

Figure 15:
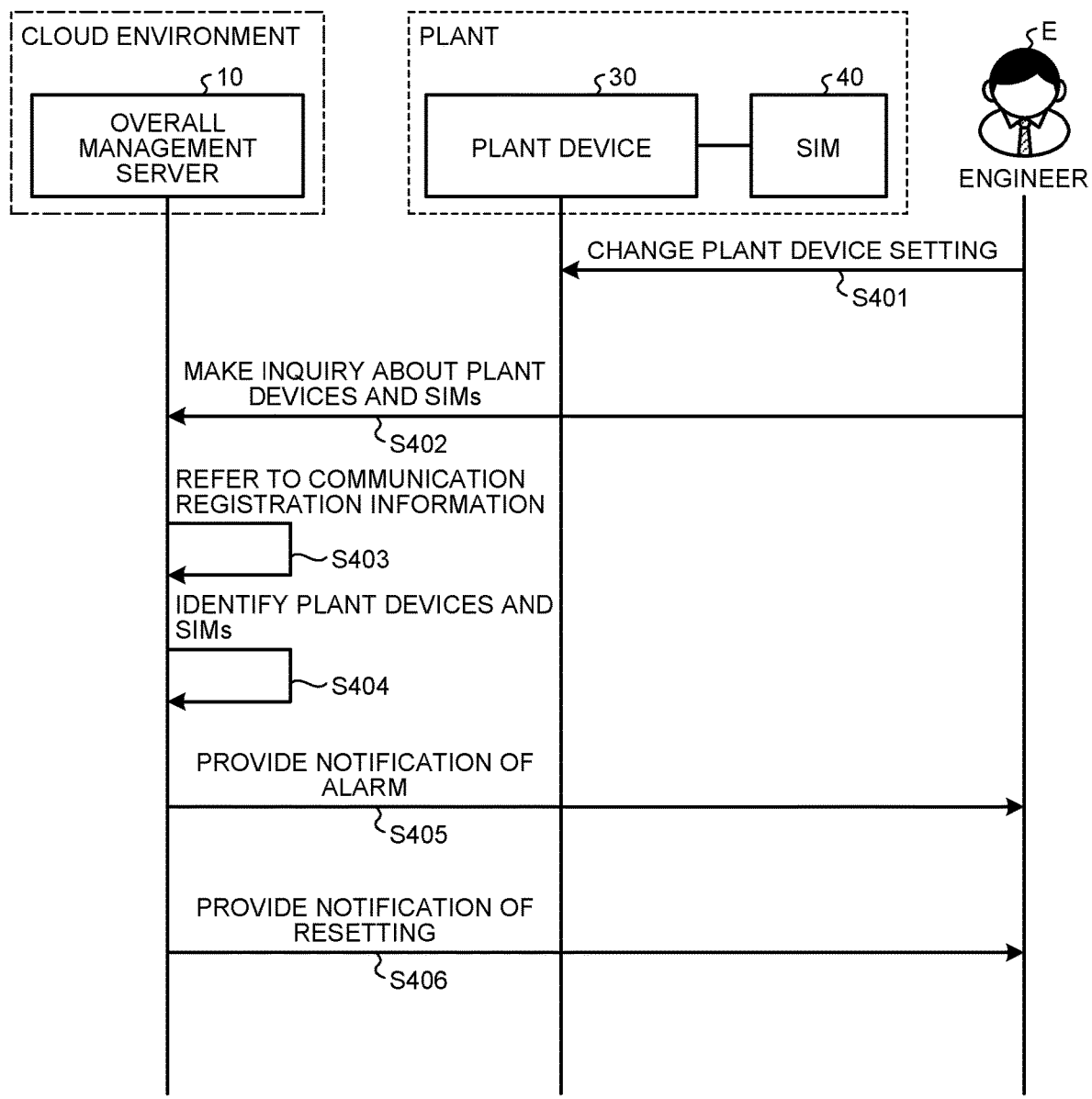
FIG. 15 is a sequence diagram of an example of a procedure of device management processing according to the fourth embodiment.

The following describes the processing procedure of the device management system 100-4 according to the fourth embodiment using FIG. 15. FIG. 15 is a sequence diagram of an example of the procedure of device management processing according to the fourth embodiment. The processing at Steps S401 to S406 below can be executed in a different order. Some processing at Steps S401 to S406 below may be omitted.

3-1. Plant Device Setting Change Processing

The engineer E changes the settings of the plant devices 30 and the SIMs 40 (Step S401). For example, the engineer E changes the SIM 40 having been inserted into the plant device 30.

3-2. Communication Registration Information Inquiry Processing

The engineer E makes an inquiry to the overall management server 10 about the plant devices 30 and the SIMs 40 (Step S402). For example, the engineer E transmits the communication identification information of all the SIMs 40 set in the plant devices 30 in the plant to the overall management server 10 in order to check where the combination of the plant devices 30 and the SIMs 40 has been changed.

3-3. Communication Registration Information Reference Processing

The overall management server 10 refers to the communication registration information (Step S403). For example, the overall management server 10 refers to the registered communication registration information and searches for the transmitted communication identification information of the SIMs 40. The overall management server 10 then identifies the plant devices 30 and the SIMs 40 (Step S404). For example, the overall management server 10 identifies the plant devices 30 of the registered SIMs 40.

3-4. Identification Result Notification Processing

The overall management server 10 provides notification of an alarm to the engineer E if there is unidentified information (Step S405). For example, if the device setting information cannot be identified for the transmitted SIMs 40, the overall management server 10 provides notification of an answer of being unregistered. In this process, the overall management server 10 may provide notification of an answer prompting resetting after the setting change (Step S406).

4. Effects of Fourth Embodiment

The following finally describes the effects of the fourth embodiment. The following describes Effects 1 and 2 corresponding to the processing according to the fourth embodiment.

4-1. Effect 1

First, in the processing according to the fourth embodiment described above, the generated communication registration information is retained, and when an inquiry about the device, the communication contract information, or the application is received, the information for the inquiry is identified by referring to the retained communication registration information, and notification of an answer based on an identification result is provided to an inquiry source. Thus, this processing can efficiently manage and grasp the state of use of the SIMs 40 by managing the relation among the devices, the SIMs 40, and the applications.

4-2. Effect 2

Second, in the processing according to the fourth embodiment described above, when the information for the inquiry is not identified, notification of an answer indicating that information on the device, the communication contract information, or the application is unregistered is provided. Thus, this processing can efficiently manage and grasp the state of use of the SIMs 40 even when the device and/or the SIMs 40 are unregistered.

System

The processing procedures, the control procedures, the specific names, and the information including various types of data and parameters shown in the above document and drawings can be changed as desired unless otherwise noted.

Each component of each apparatus illustrated in the drawings is a functionally conceptual one and does not necessarily have to be physically configured as illustrated in the drawings. That is, the specific forms of dispersion and integration of each apparatus are not limited to those illustrated in the drawings. In other words, the whole or part thereof can be configured dispersed and integrated functionally or physically in any units in accordance with various loads and the state of use.

Furthermore, the whole or any part of each processing function performed by each apparatus can be implemented by a CPU and a computer program analyzed and executed by the CPU or implemented by hardware with wired logic.

Hardware

Figure 16:
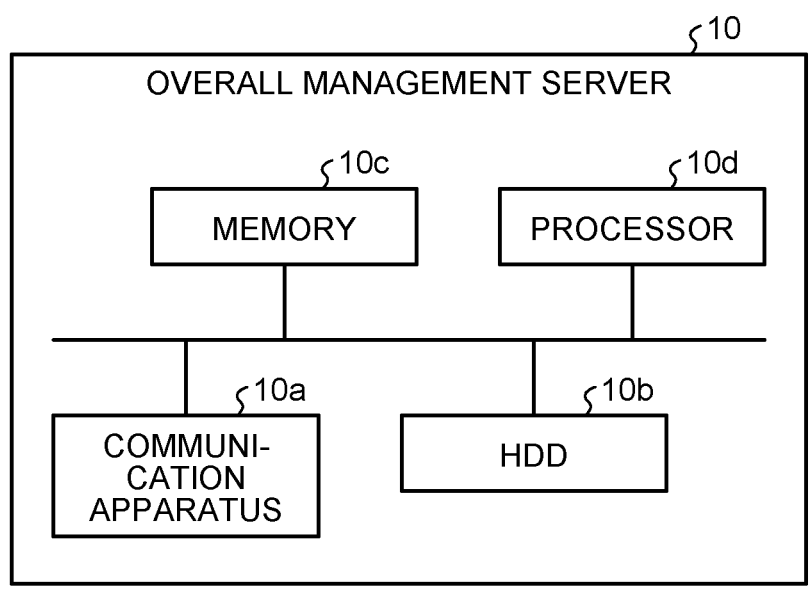
FIG. 16 is a diagram illustrating a hardware configuration example.

The following describes a hardware configuration example of the overall management server 10, which is an information providing apparatus. Other apparatuses such as the application server 20 can have the same hardware configuration. FIG. 16 is a diagram illustrating a hardware configuration example. As illustrated in FIG. 16, the overall management server 10 has a communication apparatus 10a, a hard disk drive (HDD) 10b, a memory 10c, and a processor 10d. The units illustrated in FIG. 16 are interconnected by a bus or the like.

The communication apparatus 10a is a network interface card or the like and performs communication with other servers. The HDD 10b stores therein computer programs and databases (DBs) operating the functions illustrated in FIG. 2.

The processor 10d reads a computer program executing the same processing as that by each processing unit illustrated in FIG. 2 from the HDD 10b or the like and expands it into the memory 10c, thereby operating a process executing each function described in FIG. 2 and the like. For example, this process executes the same function as that by each processing unit of the overall management server 10. Specifically, the processor 10d reads a computer program having the same functions as those of the acquisition unit 13a, the generation unit 13b, the identification unit 13c, the notification unit 13d, and the like from the HDD 10b or the like. The processor 10d then executes a process executing the same processing as that by the acquisition unit 13a, the generation unit 13b, the identification unit 13c, the notification unit 13d, and the like.

Thus, the overall management server 10 operates as an apparatus executing various types of methods of processing by reading and executing the computer program. The overall management server 10 can also read the above computer program from a recording medium by a medium reading apparatus and execute the read computer program to implement the same functions as those of the above embodiments. The computer program referred to in this other embodiment is not limited to being executed by the overall management server 10. For example, the present invention can be applied in the same manner to a case in which another computer or server executes the computer program or a case in which they collaborate to execute the computer program.

This computer program can be distributed via a network such as the Internet. This computer program can be executed by being recorded on a computer-readable recording medium such as a hard disk, a flexible disk (FD), a compact disc read only memory (CD-ROM), a magneto-optical disk (MO), or a digital versatile disc (DVD) and read by a computer from the recording medium.

Others

The following describes some examples of a combination of the disclosed technical features.

The present invention produces the effect of making it possible to efficiently grasp the state of use of SIMs.

What is claimed is:

1. An information providing apparatus comprising:
   an acquisition unit acquiring device registration information in which device setting information including device identification information of a device and communication identification information set for causing the device to perform communication and application information on an application collecting information transmitted from the device are associated with each other; and
   a generation unit generating communication registration information associating communication contract information indicating a contract state of the communication with the device registration information.

2. The information providing apparatus according to claim 1, wherein the communication identification information included in the device setting information is identification information of a subscriber identity module (SIM) card inserted into the device for causing the device to transmit information to the application.

3. The information providing apparatus according to claim 2, further including:
   a storage unit storing therein the communication registration information generated by the generation unit;
   an identification unit, when receiving an inquiry about at least one of the device, the communication contract information, and the application, identifying information for the inquiry by referring to the communication registration information stored in the storage unit; and
   a notification unit providing notification of an answer based on an identification result by the identification unit to an inquiry source.

4. The information providing apparatus according to claim 3, wherein
   communication-specific information indicated by communication contract information of the SIM card is associated with the communication registration information,
   the identification unit, when receiving the communication-specific information indicated by the communication contract information of a certain SIM, identifies at least either the device identification information or the application information associated with the communication-specific information of the certain SIM by referring to the communication registration information stored in the storage unit, and
   the notification unit provides notification of an answer including at least either the device identification information of the identified device or the identified application information.

5. The information providing apparatus according to claim 3, wherein
   communication-specific information indicated by communication contract information of the SIM card is associated with the communication registration information,
   the identification unit, when receiving identification information of a certain device, identifies communication-specific information of a certain SIM associated with the received identification information by referring to the communication registration information stored in the storage unit, and
   the notification unit provides notification of an answer including the communication-specific information indicated by the communication contract information associated with the identified communication identification information of the certain SIM.

6. The information providing apparatus according to claim 3, wherein the notification unit, when information for the inquiry is not identified, provides notification of an answer indicating that at least one of information on the device, the communication contract information, and the application is unregistered.

7. The information providing apparatus according to claim 1, wherein
the device is a plant device including at least either a communication device or a sensor device installed in a plant and acquiring plant information from the plant, and
the acquisition unit acquires, from an application collecting the plant information, the device registration information in which the application information of the application and the device setting information of the device having acquired the plant information are associated with each other.

8. A method for providing information, the method comprising:
acquiring device registration information in which device setting information including device identification information of a device and communication identification information set for causing the device to perform communication and application information on an application collecting information transmitted from the device are associated with each other; and
generating communication registration information associating communication contract information indicating a contract state of the communication with the device registration information.

9. A computer-readable recording medium having stored therein a computer program for providing information that causes a computer to execute a process, the process comprising:
acquiring device registration information in which device setting information including device identification information of a device and communication identification information set for causing the device to perform communication and application information on an application collecting information transmitted from the device are associated with each other; and
generating communication registration information associating communication contract information indicating a contract state of the communication with the device registration information.

10. A device management system comprising:
an information management apparatus executing an application collecting information transmitted from a device; and
an information providing apparatus,
the information management apparatus including:
a receiver receiving device setting information including device identification information of the device and communication identification information set for causing the device to perform communication from the device; and
a transmitter transmitting device registration information associating application information on the application with the device setting information, and
the information providing apparatus including:
an acquisition unit acquiring the device registration information from the information management apparatus, and
a generation unit generating communication registration information associating communication contract information indicating a contract state of the communication with the device registration information.

* * * * *